(12) United States Patent
Barnes et al.

(10) Patent No.: US 9,441,148 B2
(45) Date of Patent: Sep. 13, 2016

(54) METHOD AND COMPOSITION FOR ENHANCED HYDROCARBON RECOVERY

(75) Inventors: Julian Richard Barnes, Amsterdam (NL); Robert Hardy Ellison, Katy, TX (US); Marinus Johannes Faber, Rijswijk (NL); Khrystyna Groen, Amsterdam (NL); Robert Moene, Amsterdam (NL); Quoc An On, Amsterdam (NL)

(73) Assignee: Shell Oil Company, Houston, TX (US)

( * ) Notice: Subject to any disclaimer, the term of this patent is extended or adjusted under 35 U.S.C. 154(b) by 297 days.

(21) Appl. No.: 14/112,621

(22) PCT Filed: Apr. 19, 2012

(86) PCT No.: PCT/EP2012/057148
§ 371 (c)(1),
(2), (4) Date: Jan. 8, 2014

(87) PCT Pub. No.: WO2012/143433
PCT Pub. Date: Oct. 26, 2012

(65) Prior Publication Data
US 2014/0110305 A1    Apr. 24, 2014

(30) Foreign Application Priority Data
Apr. 20, 2011 (EP) .................... 11163096

(51) Int. Cl.
*C09K 8/584* (2006.01)
*E21B 43/16* (2006.01)

(52) U.S. Cl.
CPC ............... *C09K 8/584* (2013.01); *E21B 43/16* (2013.01)

(58) Field of Classification Search
CPC ........ C09K 8/584; C09K 8/602; E21B 43/16
See application file for complete search history.

(56) References Cited

U.S. PATENT DOCUMENTS

| 3,943,160 A | 3/1976 | Farmer, III et al. |
| 3,946,812 A | 3/1976 | Gale et al. |
| 4,077,471 A | 3/1978 | Shupe et al. |

(Continued)

FOREIGN PATENT DOCUMENTS

| CN | 101589128 | 11/2009 |
| CN | 101970600 | 2/2011 |

(Continued)

OTHER PUBLICATIONS

Chatzis et al.; "Correlation of Capillary Number Relationship for Sandstone"; SPE Journal; vol. 29; pp. 555-562; 1989.

(Continued)

*Primary Examiner* — Brian McCaig

(57) ABSTRACT

The invention relates to a method of treating a hydrocarbon containing formation, comprising: (a) providing a composition to at least a portion of the hydrocarbon containing formation, wherein the composition comprises an anionic surfactant based on an alkoxylated primary alcohol having a branched aliphatic group, which group has an average carbon number of from 9 to 15 and an average number of branches of from 0.5 to 2.5, and having an average of at least 0.5 mole of alkylene oxide groups per mole of primary alcohol; and (b) allowing the composition to interact with hydrocarbons in the hydrocarbon containing formation. Further, the invention relates to the hydrocarbon recovery composition that is used in said method.

18 Claims, 5 Drawing Sheets

(56) References Cited

U.S. PATENT DOCUMENTS

| | | | |
|---|---|---|---|
| 4,183,867 | A | 1/1980 | Sekiguchi et al. |
| 4,216,079 | A | 8/1980 | Newcombe |
| 4,248,793 | A | 2/1981 | Sekiguchi et al. |
| 4,293,428 | A | 10/1981 | Gale et al. |
| 4,597,879 | A | 7/1986 | Morita et al. |
| 4,733,728 | A | 3/1988 | Morita et al. |
| 4,979,564 | A | 12/1990 | Kalpakci et al. |
| 5,057,627 | A | 10/1991 | Edwards |
| 5,059,719 | A | 10/1991 | Edwards |
| 5,068,043 | A | 11/1991 | Thigpen et al. |
| 5,103,909 | A | 4/1992 | Morgenthaler et al. |
| 5,199,490 | A | 4/1993 | Surles et al. |
| 5,284,206 | A | 2/1994 | Surles et al. |
| 5,318,709 | A | 6/1994 | Wuest et al. |
| 5,510,306 | A | 4/1996 | Murray |
| 5,633,422 | A | 5/1997 | Murray |
| 5,648,584 | A | 7/1997 | Murray |
| 5,648,585 | A | 7/1997 | Murray et al. |
| 5,654,261 | A | 8/1997 | Smith |
| 5,723,423 | A | 3/1998 | Van Slyke |
| 5,849,960 | A | 12/1998 | Singleton et al. |
| 6,022,834 | A | 2/2000 | Hsu et al. |
| 6,150,222 | A | 11/2000 | Gardner et al. |
| 6,222,077 | B1 | 4/2001 | Singleton |
| 6,269,881 | B1 | 8/2001 | Chou et al. |
| 6,427,268 | B1 | 8/2002 | Davis |
| 6,439,308 | B1 | 8/2002 | Wang |
| 7,055,602 | B2 | 6/2006 | Shpakoff et al. |
| 7,137,447 | B2 | 11/2006 | Shpakoff et al. |
| 7,229,950 | B2 | 6/2007 | Shpakoff et al. |
| 7,262,153 | B2 | 8/2007 | Shpakoff et al. |
| 2009/0270281 | A1 | 10/2009 | Steinbrenner et al. |
| 2011/0281779 | A1* | 11/2011 | Weerasooriya ........ C09K 8/584 507/254 |

FOREIGN PATENT DOCUMENTS

| | | |
|---|---|---|
| CN | 101970599 | 4/2013 |
| EP | 0351928 | 1/1990 |
| WO | 9640587 | 12/1996 |
| WO | 2004081342 | 9/2004 |
| WO | 2009100298 | 8/2009 |
| WO | 2009100300 | 8/2009 |

OTHER PUBLICATIONS

Wellington et al.; "Low Surfactant Concentration Enhanced Waterflooding"; SPE Journal, vol. 2; pp. 389-405; 1997.

Falls et al.; "Field Test of Cosurfatant-Enhanced Alkaline Flooding"; Society of Petroleum Engineers Reservoir Engineering; pp. 217-223; Aug. 1994.

Liu et al.; "Favorable Attributes of Alkaline-Surfactant-Polymer Flooding"; SPE Journal; pp. 5-16; Mar. 2008.

Levitt et al.; "Identification and Evaluation of High Performance EOR Surfactants"; SPE 100089, pp. 1-11; 2006.

Stacks, H.W.; "Anionic Surfactants: Organic Chemistry"; Surfactant Science Series; vol. 56, Chapter 7; 1996.

Adami; "Production of linear alkylbenzene sulphonate and alpha-olefin sulphonates"; Surfactant Science Series, vol. 142, Chapter 5; p. 83.

Craig, Jr.; "The Reservoir Engineering Aspects of Waterflooding"; vol. 3, Chapter 2, Society of Petroleum Engineers; pp. 12-28; 1971.

Colloid, J.;"Interfacial Tensions and Solubilizing Ability of a Microemulsion Phase that Coexists with Oil and Brine"; Journal of Colloid and Interface Science; vol. 71, No. 2; pp. 408-426; Sep. 1979.

Barnes et al.; Development of Surfactants for Chemical Flooding; Difficult Reservoir Conditions; SPE 113313; pp. 1-18; 2008.

Nelson et al.; "Cosurfactant-Enchanced Alali Flooding"; SPE/DOE 12672; pp. 413-421; 1984.

Wu, Yet al.; Branched Alkyl Alcohol Propoxylated Sulfate Suractants for Improved Oil Recovery; Tenside,Surtfactants, Detergents, vol. 47, No. 3; pp. 153-161; Jan. 1, 2010.

Shekar et al.; "Laboratory Evaluation of Custom-Designed Surfactants to Remediate NAPL Source Zones"; Environmental Science & Technology; vol. 36, No. 24; pp. 5491-5497; Dec. 1, 2002.

Rosen, et al.; Ultralow Interfacial Tension for Enhanced Oil Recovery at Very Low Surfactant Concentrations; Langmuir, vol. 21, No. 9' pp. 3749-3756; Apr. 1, 2005.

Jayanti, S. et al., "Laboratory Evaluation of Custom-Desianed Surfactants to Remediate NAPL Source Zones", Environ. Sci. Technol., 2002, vol. 36, pp. 5491-5497.

* cited by examiner

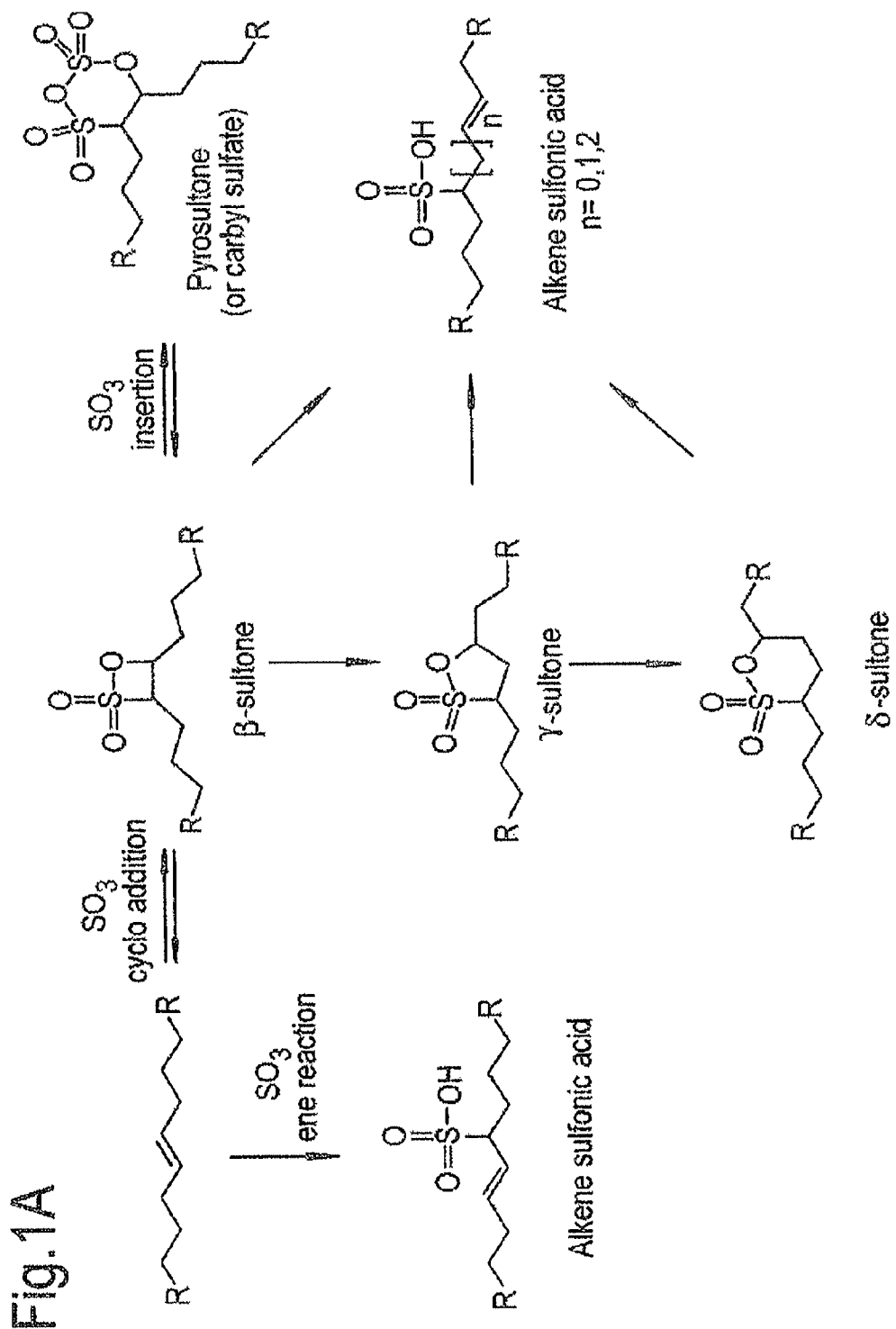

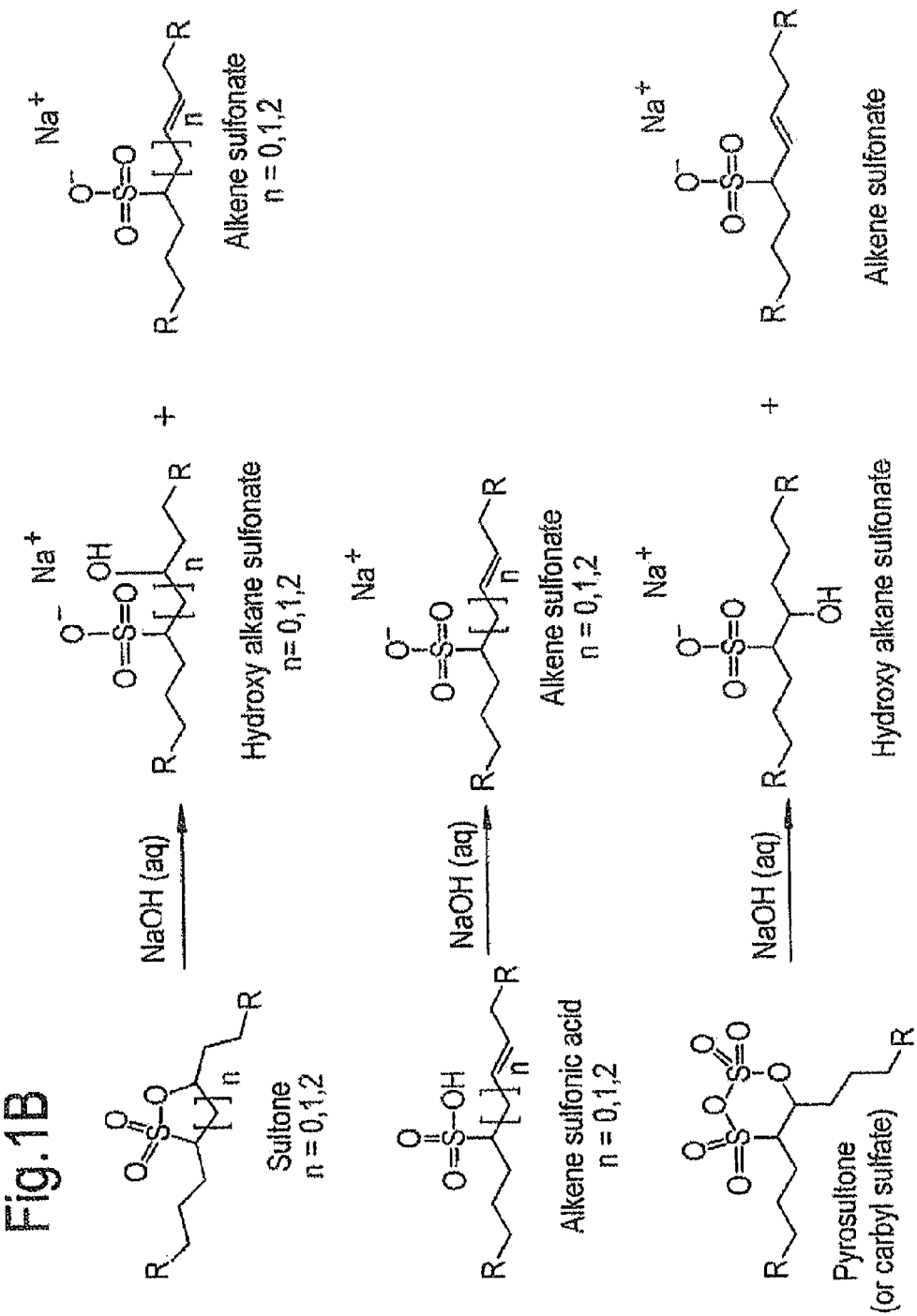

METHOD AND COMPOSITION FOR ENHANCED HYDROCARBON RECOVERY

PRIORITY CLAIM

The present application is a National Stage (§371) application of International Application No. PCT/EP2012/057148, filed 19 Apr. 2012, which claims the benefit of European Application No. 11163096.8, filed 20Apr. 2011, which is incorporated herein by reference.

Field of the Invention

The present invention relates to a method for recovery of hydrocarbons from hydrocarbon formations, and to compositions useful therein.

BACKGROUND TO THE INVENTION

Hydrocarbons, such as oil, may be recovered from hydrocarbon containing formations (or reservoirs) by penetrating the formation with one or more wells, which may allow the hydrocarbons to flow to the surface. A hydrocarbon containing formation may have a natural energy source (e.g. gas, water) to aid in mobilizing hydrocarbons to the surface of the wells. For example, water or gas may be present in the formation at sufficient levels to exert pressure on the hydrocarbons to mobilize them to the surface of the production wells. However, reservoir conditions (e.g. permeability, hydrocarbon concentration, porosity, temperature, pressure) can significantly impact on the economic viability of hydrocarbon production from any particular hydrocarbon containing formation. Furthermore, any natural energy sources that exist may become depleted over time, often long before the majority of hydrocarbons have been extracted from the reservoir. Therefore, supplemental recovery processes may be required and used to continue the recovery of hydrocarbons from the hydrocarbon containing formation. Examples of known supplemental processes include waterflooding, polymer flooding, alkali flooding, thermal processes, solution flooding or combinations thereof.

In recent years there has been increased activity in developing new and improved methods of chemical Enhanced Oil Recovery (cEOR) for maximising the yield of hydrocarbons from a subterranean reservoir. In surfactant EOR the mobilization of residual oil saturation is achieved through surfactants which generate a sufficiently (ultra) low crude oil/water interfacial tension (IFT) to give a capillary number large enough to overcome capillary forces and allow the oil to flow (Chatzis & Morrows, "Correlation of capillary number relationship for sandstone", SPE Journal, vol. 29, p. 555-562, 1989). However, different reservoirs can have very different characteristics (e.g. crude oil type, temperature, water composition—salinity, hardness etc.), and therefore, it is desirable that the structures and properties of the added surfactant(s) be matched to the particular conditions of a reservoir to achieve the required low IFT. In addition, a promising surfactant must fulfil other important criteria such as low rock retention or adsorption, compatibility with polymer, thermal and hydrolytic stability and acceptable cost (including ease of commercial scale manufacture).

Compositions and methods for EOR are described in U.S. Pat. Nos. 3,943,160, 3,946,812, 4,077,471, 4,216,079, 5,318,709, 5,723,423, 6,022,834, 6,269,881 and "Low Surfactant Concentration Enhanced Waterflooding", Wellington et al., Society of Petroleum Engineers, 1995.

Compositions and methods for EOR utilizing internal olefin sulfonates (IOSs) are known, e.g. from U.S. Pat. No. 4,597,879. The compositions described in the foregoing patent have the disadvantages that both brine solubility and divalent ion tolerance are insufficient under certain reservoir conditions. U.S. Pat. No. 4,979,564 describes the use of IOSs in a method for EOR using low tension viscous waterflood. An example of a commercially available material described as being useful was ENORDET® IOS 1720, a product of Shell Oil Company identified as a sulfonated $C_{17-20}$ internal olefin sodium salt. This material has a low degree of branching. U.S. Pat. No. 5,068,043 describes a petroleum acid soap-containing surfactant system for waterflooding wherein a cosurfactant comprising a $C_{17-20}$ or a $C_{20-24}$ IOS was used. In "Field Test of Cosurfactant-enhanced Alkaline Flooding" by Falls et al., Society of Petroleum Engineers Reservoir Engineering, 1994, the authors describe the use of a $C_{17-20}$ or a $C_{20-24}$ IOS in a waterflooding composition with an alcohol alkoxylate surfactant to keep the composition as a single phase at ambient temperature without significantly affecting performance at reservoir temperature. The water had a salinity of about 0.4 wt. % of sodium chloride.

There is also industry experience with the use of certain alcohol alkoxysulfate surfactants in EOR. However, these materials, used individually, also have disadvantages under relatively severe conditions of salinity, hardness and temperature, in part because certain alcohol alkoxysulfate surfactants are not stable at high temperature, i.e. above 70° C. For example, WO2004081342 discloses the use in EOR of a "Neodol® $C_{16}$-$C_{17}$ branched sulfate", which is an aliphatic anionic surfactant, in combination with an aliphatic nonionic additive.

Generally, solvents, such as sec-butanol, isopropanol, tert-amyl alcohol and others, also referred to as "co-solvents", are added to hydrocarbon recovery compositions in order to improve the water solubility of the surfactants under the conditions at the surface and to reduce the viscosity of the fluid under the surface. Co-solvent in alkali-surfactant-polymer or surfactant-polymer hydrocarbon recovery formulations is used to aid aqueous solubility and to improve interaction with crude oil thereby preventing the formation of highly viscous phases.

However, adding such co-solvent may also lower the solubilization ratio at optimal salinity. Thus, generally, a compromise must be made between maximum solubilization ratio (low IFT) and low viscosity and the other critical factors needed for good transport under low pressure gradients in oil reservoirs. An additional disadvantage is the associated cost of the requirement to add a co-solvent.

A hydrocarbon recovery composition comprising ammonium $C_{16-17}$ 7PO sulfate and sodium $C_{15-18}$ internal olefin sulfonate is disclosed by Liu et al. in "Favorable Attributes of Alkaline-Surfactant-Polymer Flooding", SPE Journal, March 2008, p. 5-16. It is disclosed that mixtures of said two surfactants can be injected as a single-phase micellar solution of relatively low viscosity at ambient temperature at salinities approaching or in some cases even exceeding optimal salinity for many oils without addition of alcohol or oil. The above-mentioned viscosity relates to the injectible fluid and not to micro-emulsion viscosity.

Injection of a single-phase solution is important because formation of precipitate, liquid crystal or a second liquid phase can lead to non-uniform distribution of injected material and non-uniform transport owing to phase trapping or different mobilities of coexisting phases.

Further, it is described by Levitt et al. in "Identification and Evaluation of High Performance EOR Surfactants", SPE 100089, 2006, p. 1-11, that the most promising formulation for application in the reservoir in question was a mixture of $C_{16-17}$—$(PO)_7$—$SO_4$, $C_{15-18}$ internal olefin sulfonate and sec-butanol ("PO" stands for "propylene oxy"). It is disclosed that at 1 wt. % surfactant concentration and 2 wt. % sec-butanol, this formulation equilibrates rapidly and exhibits a high solubilization ratio at optimal conditions. Thus, in this case, the weight ratio of total surfactant to co-solvent was 1:2.

It is desirable that no or substantially less co-solvent may be used in hydrocarbon recovery formulations and that at the same time an effective EOR performance of such formulations is still maintained. Using no or substantially less co-solvent is very important because co-solvent is a major chemical component of a surfactant EOR operation in terms of cost and complexity.

SUMMARY OF THE INVENTION

Surprisingly, it was found that for hydrocarbon recovery compositions comprising an anionic surfactant based on an alkoxylated primary alcohol having a branched aliphatic group, which group has an average carbon number of from 9 to 15 and an average number of branches of from 0.5 to 2.5, and having an average of at least 0.5 mole of alkylene oxide groups per mole of primary alcohol, no or substantially less co-solvent may be used and an effective EOR performance of such compositions is still maintained.

Accordingly, the present invention relates to a method of treating a hydrocarbon containing formation, comprising:
(a) providing a composition to at least a portion of the hydrocarbon containing formation, wherein the composition comprises an anionic surfactant based on an alkoxylated primary alcohol having a branched aliphatic group, which group has an average carbon number of from 9 to 15 and an average number of branches of from 0.5 to 2.5, and having an average of at least 0.5 mole of alkylene oxide groups per mole of primary alcohol; and
(b) allowing the composition to interact with hydrocarbons in the hydrocarbon containing formation.

Further, the present invention relates to the hydrocarbon recovery composition that is used in the above-mentioned method of treating a hydrocarbon containing formation.

Still further, the present invention relates to a hydrocarbon containing composition produced from a hydrocarbon containing formation, which composition comprises hydrocarbons and an anionic surfactant as defined above, more specifically one which has been produced from the hydrocarbon containing formation by means of the above-mentioned method of treating a hydrocarbon containing formation.

BRIEF DESCRIPTION OF THE DRAWINGS

FIG. 1 is a schematic diagram depicting the chemical reactions in the manufacture of branched internal olefin sulfonates.

DETAILED DESCRIPTION OF THE INVENTION

Figure 2:
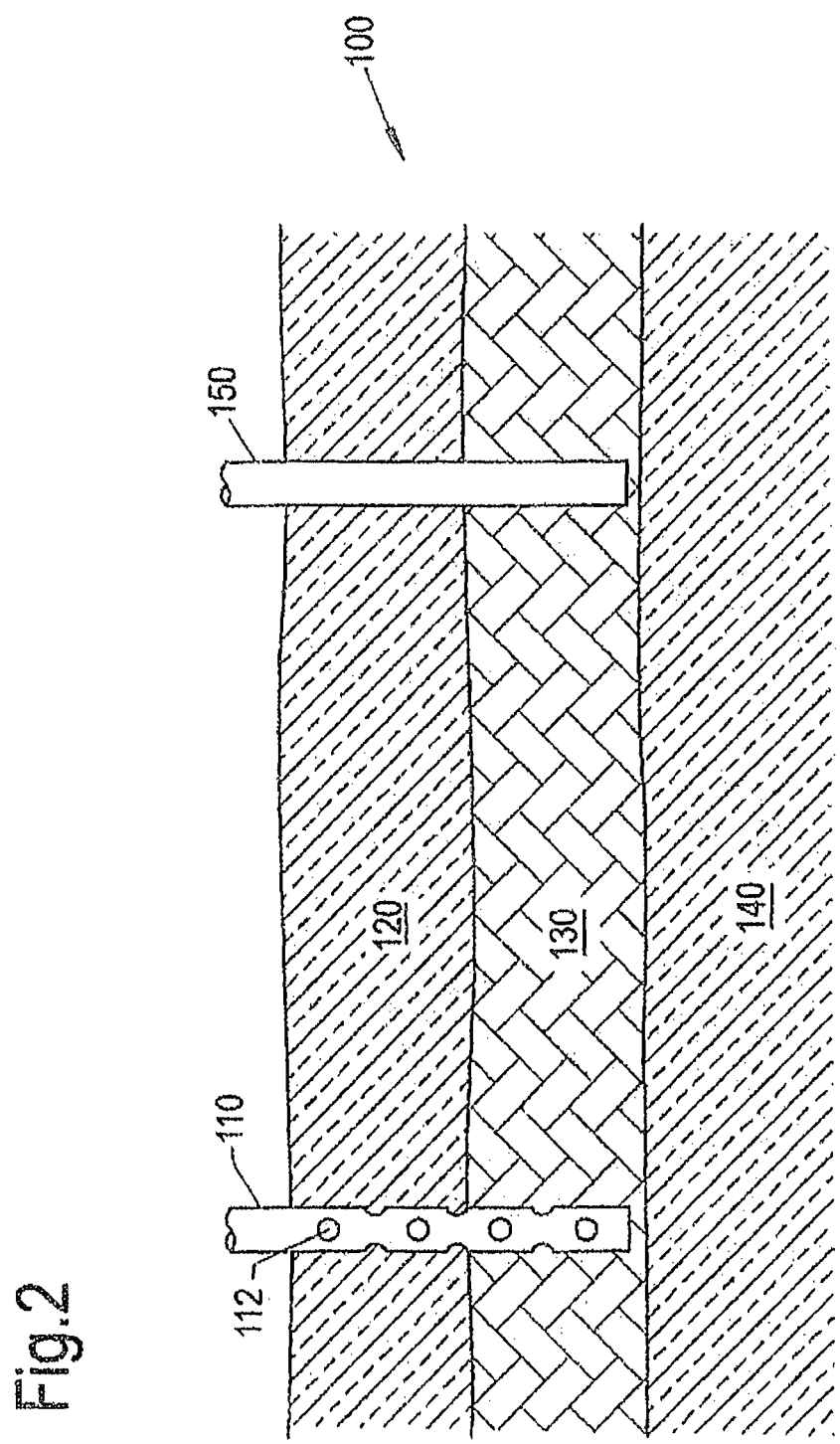
FIG. 2 is a schematic depicting of a method according to the invention.

U.S. Pat. No. 4,293,428 describes hydrocarbon recovery compositions containing derivatives of alcohols having an average carbon number from 6 to 24 and containing 1 to 10 propoxy groups and 1 to 10 ethoxy groups. The preferred alcohol precursors from U.S. Pat. No. 4,293,428 are branched alcohols having an average carbon number from 10 to 16 and having at least two branching groups. In the Examples of U.S. Pat. No. 4,293,428, only a sulfate of a propoxylated and ethoxylated i-tridecyl alcohol is mentioned.

Further, WO2009100298 discloses a hydrocarbon recovery composition comprising a derivative selected from the group consisting of a carboxylate or a sulfate or glycerol sulfonate of an ethoxylated/propoxylated primary alcohol having a branched aliphatic group with an average carbon number from 10 to 24 and having an average number of branches per aliphatic group of from 0.7 to 2.5, and having at least 0.5 moles of propylene oxide per mole of primary alcohol and having at least 0.5 moles of ethylene oxide per mole of primary alcohol. An average carbon number of from 16 to 17 is preferred.

Still further, WO2009100300 discloses a hydrocarbon recovery composition comprising a glycerol sulfonate of a propoxylated primary alcohol having a branched aliphatic group with an average carbon number from 10 to 24 and having an average number of branches per aliphatic group of from 0.7 to 2.5, and having at least 0.5 moles of propylene oxide per mole of primary alcohol. An average carbon number of from 16 to 17 is preferred.

In the present invention, the hydrocarbon recovery composition comprises one or more anionic surfactants. "Surfactant" is the shortened term for "surface-active agent", which comprises a chemical that stabilizes mixtures of oil and water by reducing the surface tension at the interface between the oil and water molecules. Because water and oil do not dissolve in each other, a surfactant may be added to the mixture to keep it from separating into layers. Any surfactant comprises a hydrophilic part and a hydrophobic part. When the hydrophilic part of a surfactant comprises a negatively charged group like a sulphonate, sulphate or carboxylate, the surfactant is called anionic. Further, an anionic surfactant comprises a counter cation to compensate for this negative charge.

That is to say, generally, an anionic surfactant has the following formula (I)

  (I)

wherein S is the negatively charged portion of the anionic surfactant, M is a counter cation and the product of n and o (n*o) equals m. Said negatively charged portion "S" thus comprises (i) the hydrophilic part, which comprises a negatively charged group, and (ii) the hydrophobic part of the anionic surfactant.

More in particular, in the present invention, the hydrocarbon recovery composition comprises an anionic surfactant based on an alkoxylated primary alcohol having a branched aliphatic group, which group has an average carbon number of from 9 to 15 and an average number of branches of from 0.5 to 2.5, and having an average of at least 0.5 mole of alkylene oxide groups per mole of primary alcohol.

Said anionic surfactant may be of the following formula (II)

  (II)

wherein R is the branched aliphatic group originating from the primary alcohol, R'—O is an alkylene oxide group originating from the alkylene oxide, x is at least 0.5, A is a negatively charged group, M is a counter cation and the product of n and o (n*o) equals m.

In above exemplary formula (II) for the anionic surfactant to be used in the present invention, m and n are integers. m may be 1, 2 or 3, preferably 1 or 2, more preferably 1. n may be 1 or 2, preferably 1. Further, o may be any number which ensures that the anionic surfactant is electrically neutral. That is to say, the product of n and o (n*o) should equal m. o may be a number in the range of from 0.5 to 3.

The counter cation in the anionic surfactant to be used in the present invention, denoted as "$M^{n+}$" in above exemplary formula (II), may be an organic cation, such as a nitrogen containing cation, for example an ammonium cation which may be unsubstituted or substituted. Further, the counter cation may be a metal cation, such as an alkali metal cation or an alkaline earth metal cation. Preferably, such alkali metal cation is lithium cation, sodium cation or potassium cation. Further, preferably, such alkaline earth metal cation is magnesium cation or calcium cation.

The branched aliphatic group in the anionic surfactant to be used in the present invention, denoted as "R" in above exemplary formula (II), has an average carbon number of from 9 to 15, preferably 10 to 15, more preferably 11 to 14, most preferably 12 to 13. The average carbon number of said branched aliphatic group is at least 9, preferably at least 10, more preferably at least 11 and most preferably at least 12. Further, the average carbon number of said branched aliphatic group is at most 15, preferably at most 14 and most preferably at most 13. The average carbon number may be determined by NMR analysis.

The branched aliphatic group in the anionic surfactant to be used in the present invention, denoted as "R" in above exemplary formula (II), has an average number of branches (i.e. a branching index, BI) of from 0.5 to 2.5, preferably 0.7 to 2.0, more preferably 0.9 to 1.8, most preferably 1.0 to 1.6. The average number of branches in said branched aliphatic group is at least 0.5, preferably at least 0.6, more preferably at least 0.7, more preferably at least 0.8, more preferably at least 0.9 and most preferably at least 1.0. Further, the average number of branches in said branched aliphatic group is at most 2.5, preferably at most 2.2, more preferably at most 2.1, more preferably at most 2.0, more preferably at most below 2.0, more preferably at most 1.9, more preferably at most 1.8, more preferably at most 1.7, more preferably at most 1.6, more preferably at most 1.5, more preferably at most 1.4, more preferably at most 1.3 and most preferably at most 1.2. The average number of branches may also be determined by NMR analysis.

The majority (i.e. over 50%) of the molecules in the anionic surfactant to be used in the present invention has at least one branch in the aliphatic group, denoted as "R" in above exemplary formula (II). That is to say, the weight ratio of linear to branched is smaller than 1:1. Suitably, the molecules are highly branched. For example, at least 70%, suitably at least 80% of the molecules contain at least one branch.

Branches in the branched aliphatic group in the anionic surfactant to be used in the present invention, denoted as "R" in above exemplary formula (II), may include, but are not limited to, methyl and/or ethyl branches. Methyl branches may represent from 20 to 99 percent, more suitably from 50 to 99 percent, of the total number of branches present in the branched aliphatic group. Ethyl branches, if present, may represent less than 30 percent, more suitably from 0.1 to 2 percent, of the total number of branches present in the branched aliphatic group. Branches other than methyl or ethyl, if present, may represent less than 10 percent, more suitably less than 0.5 percent, of the total number of branches present in the branched aliphatic group.

Further, the branches in the branched aliphatic group in the anionic surfactant to be used in the present invention, denoted as "R" in above exemplary formula (II), may have less than 0.5 percent aliphatic quaternary carbon atoms.

The anionic surfactant to be used in the present invention has an average of at least 0.5 mole, preferably of from 2 to 20 moles, more preferably of from 4 to 17 moles, more preferably of from 6 to 14 moles, most preferably of from 7 to 13 moles, of alkylene oxide groups per mole of primary alcohol. The average number of moles of alkylene oxide groups per mole of primary alcohol in said surfactant is at least 0.5, preferably at least 2, more preferably at least 3, more preferably at least 4, more preferably at least 5 and most preferably at least 6. Further, the average number of moles of alkylene oxide groups per mole of primary alcohol in said surfactant is preferably at most 20, more preferably at most 18, more preferably at most 17, more preferably at most 16, more preferably at most 15 and most preferably at most 14.

The amount of alkylene oxide used should not to be too small in order to minimize the amount of non-alkoxylated alcohol. On the other hand, the amount of alkylene oxide used should not to be too high in order to prevent the molecule from losing its ability to function as a surfactant, especially in a case where the carbon number of the branched aliphatic group, denoted as "R" in above exemplary formula (II), is too small relative to the amount of alkylene oxide in the molecule. In order for the molecule to function successfully as a surfactant in the hydrocarbon containing formation, there must be a proper balance between the length of the oil soluble carbon chain part of the molecule and the water soluble alkylene oxide part of the molecule.

The alkylene oxide groups in the anionic surfactant to be used in the present invention may comprise any alkylene oxide groups. For example, said alkylene oxide groups may comprise ethylene oxide groups, propylene oxide groups and butylene oxide groups or a mixture thereof, such as a mixture of ethylene oxide and propylene oxide groups. In case of a mixture of ethylene oxide and propylene oxide groups, the mixture may be random or blockwise. Preferably, said alkylene oxide groups consist of propylene oxide groups.

A negatively charged group may be attached to the alkylene oxide portion of the anionic surfactant to be used in the present invention. Such negatively charged group may be $A^{m-}$ as shown in above exemplary formula (II), and may be any negatively charged group.

Said negatively charged group is preferably a group comprising the $-SO_3^-$ moiety. The $-SO_3^-$ moiety is preferably attached directly to the alkylene oxide portion of the anionic surfactant, as shown in below exemplary formula (III) which falls under above exemplary formula (II):

$$[R-O-[R'-O]_x-SO_3^-][M^{n+}]_o \qquad (III)$$

Such surfactant is herein referred to as a sulfate surfactant in view of the presence of an $-O-SO_3^-$ moiety.

Further, said $-SO_3^-$ moiety may be attached indirectly to the alkylene oxide portion of the anionic surfactant via an intermediate alkyl group, suitably a $C_1$-$C_4$ alkyl group, wherein the $-SO_3^-$ moiety is not attached to an oxygen atom but to a carbon atom of said alkyl group, as shown in below exemplary formula (IV) which falls under above exemplary formula (II):

$$[R\text{—}O\text{—}[R'\text{—}O]_x\text{-}L\text{-}SO_3^-][M^{n+}]_o \qquad (IV)$$

wherein L is an alkyl group, suitably a $C_1$-$C_4$ alkyl group, which may be unsubstituted or substituted. Such surfactant is herein referred to as a sulfonate surfactant in view of the presence of a —C—$SO_3^-$ moiety.

An example of such -L-$SO_3^-$ moiety is a glycidyl sulfonate moiety as represented by the formula —$CH_2CH(OH)CH_2$—$SO_3^-$.

Further, said negatively charged group may be a group comprising the —C(=O)O$^-$ moiety. Said —C(=O)O$^-$ moiety may be attached either directly or indirectly to the alkylene oxide portion of the anionic surfactant. An example of such anionic surfactant comprising the —C(=O)O$^-$ moiety, herein referred to as a carboxylate surfactant, is a surfactant of below exemplary formula (V) which falls under above exemplary formula (II):

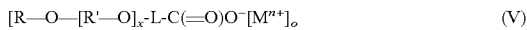
$$[R\text{—}O\text{—}[R'\text{—}O]_x\text{-}L\text{-}C(=O)O^-[M^{n+}]_o \qquad (V)$$

wherein L is either absent, in which case "-L-" represents a single bond, or is an alkyl group, suitably a $C_1$-$C_4$ alkyl group, which may be unsubstituted or substituted.

The branched primary alcohol, from which the anionic surfactant, which may be of above exemplary formula (II), from the hydrocarbon recovery composition of the present invention, originates, may be prepared by hydroformylation of a branched olefin. Preparations of branched olefins are described in U.S. Pat. Nos. 5,510,306, 5,648,584 and 5,648,585, the disclosures of all of which are incorporated herein by reference. Preparations of branched long chain aliphatic alcohols are described in U.S. Pat. Nos. 5,849,960, 6,150,222, 6,222,077, the disclosures of all of which are incorporated herein by reference.

The primary alcohol used in preparing the anionic surfactant, which may be of above exemplary formula (II), from the hydrocarbon recovery composition of the present invention, may be alkoxylated by reacting with alkylene oxide in the presence of an appropriate alkoxylation catalyst. The alkoxylation catalyst may be potassium hydroxide or sodium hydroxide which is commonly used commercially for alkoxylating alcohols. The primary alcohols may be alkoxylated using a double metal cyanide catalyst as described in U.S. Pat. No. 6,977,236, the disclosure of which is incorporated herein by reference. The primary alcohols may also be alkoxylated using a lanthanum-based or a rare earth metal-based alkoxylation catalyst as described in U.S. Pat. Nos. 5,059,719 and 5,057,627, the disclosures of which are incorporated herein by reference.

Primary alcohol alkoxylates may be prepared by adding to the primary alcohol or mixture of primary alcohols a calculated amount, for example from 0.1 percent by weight to 0.6 percent by weight, of a strong base, typically an alkali metal or alkaline earth metal hydroxide such as sodium hydroxide or potassium hydroxide, which serves as a catalyst for alkoxylation. An amount of alkylene oxide calculated to provide the desired number of moles of alkylene oxide groups per mole of primary alcohol is then introduced and the resulting mixture is allowed to react until the alkylene oxide is consumed. Suitable reaction temperatures range from 120 to 220° C.

Primary alcohol alkoxylates may be prepared by using a multi-metal cyanide catalyst as the alkoxylation catalyst. The catalyst may be contacted with the primary alcohol and then both may be contacted with the alkylene oxide reactant which may be introduced in gaseous form. The reaction temperature may range from 90° C. to 250° C. and super atmospheric pressures may be used if it is desired to maintain the primary alcohol substantially in the liquid state.

Narrow molecular weight range primary alcohol alkoxylates may be produced by utilizing a soluble basic compound of elements in the lanthanum series elements or the rare earth elements as the alkoxylation catalyst. Lanthanum phosphate is particularly useful. The alkoxylation is carried out employing conventional reaction conditions such as those described above.

It should be understood that the alkoxylation procedure serves to introduce a desired average number of alkylene oxide units per mole of primary alcohol alkoxylate. For example, treatment of a primary alcohol mixture with 1.5 moles of alkylene oxide per mole of primary alcohol serves to effect the alkoxylation of each alcohol molecule with an average of 1.5 alkylene oxide groups per mole of primary alcohol, although a substantial proportion of primary alcohol will have become combined with more than 1.5 alkylene oxide groups and an approximately equal proportion will have become combined with less than 1.5. In a typical alkoxylation product mixture, there is also a minor proportion of unreacted primary alcohol.

As mentioned above, a negatively charged group, such as a sulfate group, may be attached to the primary alcohol alkoxylates. This is demonstrated below, by way of example only, with reference to a sulfate anionic surfactant.

The primary alcohol alkoxylates may be sulfated using one of a number of sulfating agents including sulfur trioxide, complexes of sulfur trioxide with (Lewis) bases, such as the sulfur trioxide pyridine complex and the sulfur trioxide trimethylamine complex, chlorosulfonic acid and sulfamic acid. The sulfation may be carried out at a temperature preferably not above 80° C. The sulfation may be carried out at temperature as low as −20° C., but higher temperatures are more economical. For example, the sulfation may be carried out at a temperature from 20 to 70° C., preferably from 20 to 60° C., and more preferably from 20 to 50° C. Sulfur trioxide is the most economical sulfating agent.

The primary alcohol alkoxylates may be reacted with a gas mixture which in addition to at least one inert gas contains from 1 to 8 percent by volume, relative to the gas mixture, of gaseous sulfur trioxide, preferably from 1.5 to 5 percent volume. In principle, it is possible to use gas mixtures having less than 1 percent by volume of sulfur trioxide but the space-time yield is then decreased unnecessarily. Inert gas mixtures having more than 8 percent by volume of sulfur trioxide in general may lead to difficulties due to uneven sulfation, lack of consistent temperature and increasing formation of undesired byproducts. Although other inert gases are also suitable, air or nitrogen are preferred, as a rule because of easy availability.

The reaction of the primary alcohol alkoxylate with the sulfur trioxide containing inert gas may be carried out in falling film reactors. Such reactors utilize a liquid film trickling in a thin layer on a cooled wall which is brought into contact in a continuous current with the gas. Kettle cascades, for example, would be suitable as possible reactors. Other reactors include stirred tank reactors, which may be employed if the sulfation is carried out using sulfamic acid or a complex of sulfur trioxide and a (Lewis) base, such as the sulfur trioxide pyridine complex or the sulfur trioxide trimethylamine complex. These sulfation agents would allow an increased residence time of sulfation without the risk of ethoxylate chain degradation and olefin elimination by (Lewis) acid catalysis.

The molar ratio of sulfur trioxide to the primary alcohol alkoxylate may be 1.4 to 1 or less including 0.8 to 1 mole of sulfur trioxide used per mole of OH groups in the primary alcohol alkoxylate. Sulfur trioxide may be used to sulfate the alkoxylates and the temperature may range from −20° C. to 50° C., preferably from 5° C. to 40° C., and the pressure may be in the range from 100 to 500 kPa abs. The reaction may be carried out continuously or discontinuously. The residence time for sulfation may range from 0.5 seconds to 10 hours, but is preferably from 0.5 seconds to 20 minutes.

The sulfation may be carried out using chlorosulfonic acid at a temperature from −20° C. to 50° C., preferably from 0° C. to 30° C. The mole ratio between the primary alcohol alkoxylate and the chlorosulfonic acid may range from 1:0.8 to 1:1.2, preferably 1:0.8 to 1:1. The reaction may be carried out continuously or discontinuously for a time between fractions of seconds (i.e., 0.5 seconds) to 20 minutes.

Following sulfation, the liquid reaction mixture may be neutralized using an aqueous alkali metal hydroxide, such as sodium hydroxide or potassium hydroxide, an aqueous alkaline earth metal hydroxide, such as magnesium hydroxide or calcium hydroxide, or bases such as ammonium hydroxide, substituted ammonium hydroxide, sodium carbonate or potassium hydrogen carbonate. The neutralization procedure may be carried out over a wide range of temperatures and pressures. For example, the neutralization procedure may be carried out at a temperature from 0° C. to 65° C. and a pressure in the range from 100 to 200 kPa abs. The neutralization time may be in the range from 0.5 hours to 1 hour but shorter and longer times may be used where appropriate.

The hydrocarbon recovery composition of the present invention may comprise 10 wt. % or more, for example of from 10 to 90 wt. % of the above-discussed anionic surfactant, which surfactant may be of above exemplary formula (II). Said percentages do not apply to the anionic surfactant as present in the fluid that may be injected into the hydrocarbon containing formation in the present method. In such fluid, the surfactant concentration is relatively low, as further discussed below.

In addition to the above-discussed anionic surfactant, which surfactant may be of above exemplary formula (II), the hydrocarbon recovery composition of the present invention may comprise a further anionic surfactant, more in particular an internal olefin sulfonate (IOS).

If an IOS is comprised in the hydrocarbon recovery composition of the present invention, the IOS comprises a mixture of IOS molecules. Said IOS may comprise one or more IOS selected from the group consisting of $C_{15-18}$ IOS, $C_{19-23}$ IOS, $C_{20-24}$ IOS and $C_{24-28}$ IOS. Suitably, said IOS comprises $C_{19-23}$ IOS or $C_{20-24}$ IOS or a mixture thereof. IOS suitable for use in the present invention include those from the ENORDET™ series of surfactants commercially available from Shell Chemicals Company.

The IOS that can be used in the present invention may be characterised by their average carbon number which is determined by multiplying the number of carbon atoms of each IOS in the blend by the weight percent of that IOS and then adding the products.

"$C_{15-18}$ internal olefin sulfonate" as used herein means a mixture of internal olefin sulfonates wherein the mixture has an average carbon number of from 16 to 17 and at least 50% by weight, preferably at least 75% by weight, most preferably at least 90% by weight, of the internal olefin sulfonates in the mixture contain from 15 to 18 carbon atoms.

"$C_{18-28}$ internal olefin sulfonate" as used herein means a mixture of internal olefin sulfonates wherein the mixture has an average carbon number of from 21 to 23 and at least 50% by weight, preferably at least 60% by weight, of the internal olefin sulfonates in the mixture contain from 19 to 23 carbon atoms.

"$C_{20-24}$ internal olefin sulfonate" as used herein means a mixture of internal olefin sulfonates wherein the mixture has an average carbon number of from 20 to 23, preferably 20.5 to 23, and at least 50% by weight, preferably at least 65% by weight, most preferably at least 75% by weight, of the internal olefin sulfonates in the mixture contain from 20 to 24 carbon atoms.

"$C_{24-28}$ internal olefin sulfonate" as used herein means a blend of internal olefin sulfonates wherein the blend has an average carbon number of from 24.5 to 27 and at least 40% by weight, preferably at least 50% by weight, most preferably at least 60% by weight, of the internal olefin sulfonates in the blend contain from 24 to 28 carbon atoms.

The olefin from the IOS may be branched or unbranched. If the olefin is branched, the olefin may have an average number of branches which is at least 0.6, preferably of from 0.6 to 3.0, more preferably of from 0.6 to 2.0, more preferably of from 0.6 to 1.2, most preferably of from 0.8 to 1.0. Further, if the olefin is branched, the majority (i.e. over 50%) of the molecules has at least one branch. That is to say, the weight ratio of linear to branched is smaller than 1:1. Suitably, the molecules are highly branched. For example, at least 70%, suitably at least 80% and more suitably at least 90% of the molecules contain at least one branch.

FIG. 1 is a schematic diagram depicting the chemical reactions in the manufacture of branched internal olefin sulfonates: (A) illustrates the reactions of an internal olefin with sulfur trioxide during the sulfonation process; (B) illustrates the subsequent neutralisation and hydrolysis process to form an internal olefin sulfonate.

Generally, an IOS mixture comprises a large range of different molecules, which may differ from one another in terms of carbon chain length, amount of branching and the number and distribution of functional groups such as sulfonate and hydroxyl groups. For example, an IOS mixture comprises both hydroxyalkane sulfonate molecules and alkene sulfonate molecules and possibly also di-sulfonate molecules. Hydroxyalkane sulfonate molecules and alkene sulfonate molecules are shown in FIG. 1B. Di-sulfonate molecules originate from a further sulfonation, for example of an alkene sulfonic acid as shown in FIG. 1A. Thus, an IOS having a certain carbon number is in fact a mixture of different chemical components all having the same carbon number, which mixture at least comprises both a hydroxy alkane sulfonate and an alkene sulfonate and may further comprise a di-sulfonate.

The sulfonation of internal olefins may be carried out at varying $SO_3$/olefin ratios. The sulfonation level may be "low" (e.g. less than or equal to 1.1 mol $SO_3$/mol olefin), or "high" (e.g. greater than or equal to 1.1 mol $SO_3$/mol olefin). Accordingly, the average number of sulfonate groups per olefin molecule will in most cases be determined by the applied $SO_3$-olefin molar ratio in the sulfonation process; in general, the higher the $SO_3$-olefin molar ratio is during the sulfonation process the higher is the number of $SO_3$ groups attached to the olefin. That is to say, the higher the relative amount of di-sulfonate molecules in the final IOS.

The mixture of internal olefin sulfonate molecules, if present in the hydrocarbon recovery composition of the present invention, may comprise: at least 50% hydroxyalkane sulfonate molecules; up to 40% alkene sulfonate molecules; and up to 10% di-sulfonate molecules. Suitably, the mixture may comprise: from 50% to 90% hydroxyalkane sulfonate molecules; from 10% to 40% alkene sulfonate molecules; and from 0% to 10% di-sulfonate molecules. Beneficially, the mixture of internal olefin sulfonate molecules comprises: from 50% to 70% hydroxyalkane sulfonate molecules; from 30% to 40% alkene sulfonate molecules; and from 1% to 9% di-sulfonate molecules. In a particularly suitable embodiment the mixture of internal olefin sulfonate molecules comprises: from approximately 56% to approximately 64% hydroxyalkane sulfonate molecules; from approximately 32% to approximately 37% alkene sulfonate molecules; and from approximately 4% to approximately 7% di-sulfonate molecules; in each case provided the overall composition adds up to 100%. The composition of the mixture of internal olefin sulfonates may be measured, for example, using a liquid chromatography/mass spectrometry (LC-MS) technique.

An internal olefin sulfonate is made from an internal olefin. An internal olefin is an olefin whose double bond is located anywhere along the carbon chain except at a terminal carbon atom. Internal olefins may be made by skeletal isomerization of alpha-olefins which have a double bond located at a terminal position. Suitable processes for making internal olefins include those described in U.S. Pat. Nos. 5,510,306, 5,633,422, 5,648,584, 5,648,585, 5,849,960, EP0830315B1 and "Anionic Surfactants: Organic Chemistry", Surfactant Science Series, Vol. 56, Chapter 7, Marcel Dekker, Inc., New York, 1996, ed. H. W. Stacke, the disclosures of all of which are incorporated herein by reference.

The production of internal olefin sulfonates from internal olefins comprises steps of sulfonation, neutralisation and hydrolysis (Adami, "Production of linear alkylbenzene sulphonate and alpha-olefin sulphonates", Surfactant Science Series, Vol. 142, chapter 5, page 83), as is shown in FIG. 1.

In the sulfonation step, $SO_3$ may be used for reaction with internal olefins leading to the formation of cyclic intermediates known as beta-sultones, which rapidly undergo isomerisation to unsaturated sulfonic acids and the more stable gamma- and delta-sultones. This reaction is preferably carried out in a "falling film reactor" where the olefin feed is continuously fed onto the inside surfaces of a tube and gaseous $SO_3$ is fed into the tube to react with the falling olefin film in a controlled manner. In the neutralisation step, aqueous sodium hydroxide may be used to partially hydrolyse these sultones to a mixture of hydroxyalkane sulfonates and alkene sulfonates and further conversion may be achieved in a subsequent hydrolysis step carried out at elevated temperature. FIG. 1A illustrates the reactions involved in the sulfonation process and FIG. 1B shows the neutralisation and hydrolysis process.

A process which can be used to make internal olefin sulfonates for use in the present invention comprises reacting in a film reactor an internal olefin as described above with a sulfonating agent in a mole ratio of sulfonating agent to internal olefin of 1:1 to 1.6:1 while cooling the reactor with a cooling means having a temperature not exceeding 90° C., directly neutralizing the obtained reaction product of the sulfonating step and, without extracting the unreacted internal olefin, hydrolyzing the neutralized reaction product.

In the preparation of the sulfonates derived from internal olefins, the internal olefins are reacted with a sulfonating agent, which may be sulfur trioxide, sulfuric acid, or oleum, with the formation of beta-sultone and some alkene sulfonic acid. The film reactor is preferably a falling film reactor.

The reaction products are neutralized and hydrolyzed. Under certain circumstances, for instance aging, the beta-sultones are converted into gamma-sultones which may be converted into delta-sultones. After neutralization and hydrolysis, gamma-hydroxy sulfonates and delta-hydroxy sulfonates are obtained. A disadvantage of these two sultones is that they are more difficult to hydrolyze than beta-sultones. Thus, in most embodiments it is preferable to proceed without aging. The beta sultones, after hydrolysis, give beta-hydroxy sulfonates. These materials do not have to be removed because they form useful surfactant structures.

The cooling means, which is preferably water, has a temperature preferably not exceeding 90° C., especially a temperature in the range of from 20 to 50° C. Depending upon the circumstances, lower temperatures may also be used.

The reaction mixture may be fed to a neutralization unit and then to a hydrolysis unit. The neutralization can be carried out with a water soluble base, such as sodium hydroxide or sodium carbonate. The corresponding bases derived from potassium or ammonium are also suitable. The neutralization of the reaction product from the falling film reactor is generally carried out with excessive base, calculated on the acid component. Generally, neutralization is carried out at a temperature in the range of from 0 to 80° C. Hydrolysis may be carried out at a temperature in the range of from 100 to 250° C., preferably 130 to 200° C. The hydrolysis time generally may be from 5 minutes to 4 hours. Alkaline hydrolysis may be carried out with hydroxides, carbonates, bicarbonates of (earth) alkali metals, and amine compounds.

This process may be carried out batchwise, semi-continuously, or continuously. The reaction is generally performed in a falling film reactor which is cooled by flowing a cooling means at the outside walls of the reactor. At the inner walls of the reactor, the internal olefin flows in a downward direction. Sulfur trioxide is diluted with a stream of nitrogen, air, or any other inert gas into the reactor. The concentration of sulfur trioxide generally is between 2 and 5 percent by volume based on the volume of the carrier gas. In the preparation of internal olefin sulfonates, it is beneficial that in the neutralization hydrolysis step very intimate mixing of the reactor product and the aqueous base is achieved. This can be done, for example, by efficient stirring, by the addition of a co-solvent (such as a lower alcohol), by the addition of a non-ionic surfactant (such as an ethoxylate of an alcohol) or by the addition of a phase transfer agent.

U.S. Pat. Nos. 4,183,867, 4,248,793 and EP0351928B1, the disclosures of all of which are incorporated herein by reference, disclose processes which can be used to make the internal olefin sulfonates to be used in the present invention. Further, internal olefin sulfonates may be synthesised in a way as described by Van Os et al. in "Anionic Surfactants: Organic Chemistry", Surfactant Science Series 56, ed. Stacke H. W., 1996, Chapter 7: Olefin sulfonates, page 363, the disclosure of which is incorporated herein by reference.

The hydrocarbon recovery composition of the present invention may comprise 10 wt. % or more, for example of from 10 to 90 wt. % of the above-discussed IOS surfactant. Said percentages do not apply to the surfactant as present in the fluid that may be injected into the hydrocarbon containing formation in the present method. In such fluid, the surfactant concentration is relatively low, as further discussed below.

Further, if the hydrocarbon recovery composition of the present invention also comprises an IOS surfactant, said composition may comprise the anionic surfactant which may be of above exemplary formula (II), component (i), and said IOS surfactant, component (ii), in a weight ratio of (i) to (ii) which lies between 90:10 and 10:90, suitably between 80:20 and 20:80.

Further, the hydrocarbon recovery composition of the present invention may comprise a co-solvent. Suitable co-solvents include low molecular weight alcohols and other organic solvents or combinations thereof.

Suitable low molecular weight alcohols for use as co-solvent in said hydrocarbon recovery composition include $C_1$-$C_{10}$ alkyl alcohols, more suitably $C_1$-$C_8$ alkyl alcohols, most suitably $C_1$-$C_6$ alkyl alcohols, or combinations thereof. Examples of suitable $C_1$-$C_4$ alkyl alcohols are methanol, ethanol, 1-propanol, 2-propanol (isopropyl alcohol), 1-butanol, 2-butanol (sec-butyl alcohol), 2-methyl-1-propanol (iso-butyl alcohol) and 2-methyl-2-propanol (tert-butyl alcohol). Examples of suitable $C_5$ alkyl alcohols are 1-pentanol, 2-pentanol and 3-pentanol, and branched $C_5$ alkyl alcohols, such as 2-methyl-2-butanol (tert-amyl alcohol). Examples of suitable $C_6$ alkyl alcohols are 1-hexanol, 2-hexanol and 3-hexanol, and branched $C_6$ alkyl alcohols Suitable other organic solvents for use as co-solvent in said hydrocarbon recovery composition include methyl ethyl ketone, acetone, lower alkyl cellosolves, lower alkyl carbitols or combinations thereof.

Further, the hydrocarbon recovery composition of the present invention may comprise one or more compounds which under the conditions in a hydrocarbon containing formation may be converted into any of the above-mentioned co-colvents, such as one or more of the above-mentioned low molecular weight alcohols. Such precursor co-solvent compounds may include ether compounds, such as ethylene glycol monobutyl ether (EGBE), diethylene glycol monobutyl ether (DGBE) and triethylene glycol monobutyl ether (TGBE). The latter 3 ether compounds may be converted under the conditions in a hydrocarbon containing formation into ethanol and 1-butanol.

In the present invention, surprisingly, no co-solvent or only a relatively small amount of co-solvent may be used, whereas at the same time an effective EOR performance is still maintained. This can inter alia be demonstrated with reference to the ratio of the total weight of surfactant(s) to the total weight of co-solvent(s). Preferably, in the present invention, either no co-solvent is used or a co-solvent is used in such an amount that the total weight of surfactant(s) to the total weight of co-solvent(s) is above 1:3.

Preferably, if a co-solvent is used in the present invention, it is used in such an amount that the total weight of surfactant(s) to the total weight of co-solvent(s) is above 1:3.0, more preferably above 1:2.8, more preferably above 1:2.6, more preferably above 1:2.4, more preferably above 1:2.2, more preferably above 1:2.0, more preferably above 1:1.8, more preferably above 1:1.6, more preferably above 1:1.4, more preferably above 1:1.2, more preferably above 1:1.0, more preferably above 1:0.9, more preferably above 1:0.8, more preferably above 1:0.7, more preferably above 1:0.6, more preferably above 1:0.5, more preferably above 1:0.4, more preferably above 1:0.3, more preferably above 1:0.2, most preferably above 1:0.1.

The hydrocarbon recovery composition of the present invention may be provided to the hydrocarbon containing formation by diluting it with water and/or brine which may originate from the formation from which hydrocarbons are to be recovered, thereby forming a fluid that can be injected into the hydrocarbon containing formation, that is to say the injectable fluid. Said injectable fluid may comprise of from 0.1 to 4 wt. % of the hydrocarbon recovery composition of the present invention, that is to say in addition to the water and/or brine that is contained in the injectable fluid. The amount of the surfactant(s) in the injectable fluid may be of from 0.05 to 2 wt. %, preferably 0.1 to 1.5 wt. %, more preferably 0.1 to 1.0 wt. %, most preferably 0.2 to 0.5 wt. %. If a co-solvent is used in the present invention, the amount of the co-solvent(s) in the injectable fluid may be such that the total weight of surfactant(s) to the total weight of co-solvent(s) in the injectable fluid is as is described above for the hydrocarbon recovery composition of the present invention. Further, if a co-solvent is used in the present invention, the amount of the co-solvent(s) in the injectable fluid is suitably below 1 wt. %, or below 0.8 wt. %, or below 0.6 wt, or below 0.5 wt. %.

In the present invention, the temperature within the hydrocarbon containing formation may be between 10° C. and 150° C., optionally between 30° C. and 90° C. Further, in the present invention, the salinity of the hydrocarbon containing formation may be between 0.5% and 20%, or between 0.5% and 10% or between 1% and 6%.

Hydrocarbons may be produced from hydrocarbon formations through wells penetrating a hydrocarbon containing formation. "Hydrocarbons" are generally defined as molecules formed primarily of carbon and hydrogen atoms such as oil and natural gas. Hydrocarbons may also include other elements, such as, but not limited to, halogens, metallic elements, nitrogen, oxygen and/or sulfur. Hydrocarbons derived from a hydrocarbon formation may include, but are not limited to, kerogen, bitumen, pyrobitumen, asphaltenes, oils or combinations thereof. Hydrocarbons may be located within or adjacent to mineral matrices within the earth. Matrices may include, but are not limited to, sedimentary rock, sands, silicilytes, carbonates, diatomites and other porous media.

A "formation" includes one or more hydrocarbon containing layers, one or more non-hydrocarbon layers, an overburden and/or an underburden. An "overburden" and/or an "underburden" includes one or more different types of impermeable materials. For example, overburden/underburden may include rock, shale, mudstone, or wet/tight carbonate (i.e., an impermeable carbonate without hydrocarbons). For example, an underburden may contain shale or mudstone. In some cases, the overburden/underburden may be somewhat permeable. For example, an underburden may be composed of a permeable mineral such as sandstone or limestone. At least a portion of a hydrocarbon containing formation may exist at less than or more than 1000 feet (305 meters) below the earth's surface.

Properties of a hydrocarbon containing formation may affect how hydrocarbons flow through an underburden/overburden to one or more production wells. Properties include, but are not limited to, porosity, permeability, pore size distribution, surface area, salinity or temperature of formation. Overburden/underburden properties in combination with hydrocarbon properties, such as, capillary pressure (static) characteristics and relative permeability (flow) characteristics may affect mobilization of hydrocarbons through the hydrocarbon containing formation.

Permeability of a hydrocarbon containing formation may vary depending on the formation composition. A relatively permeable formation may include heavy hydrocarbons entrained in, for example, sand or carbonate. "Relatively permeable," as used herein, refers to formations or portions thereof, that have an average permeability of 10 millidarcy or more. "Relatively low permeability" as used herein, refers to formations or portions thereof that have an average permeability of less than 10 millidarcy. One darcy is equal to 0.99 square micrometers. An impermeable portion of a formation generally has a permeability of less than 0.1 millidarcy. In some cases, a portion or all of a hydrocarbon portion of a relatively permeable formation may include predominantly heavy hydrocarbons and/or tar with no supporting mineral grain framework and only floating (or no) mineral matter (e.g., asphalt lakes).

Fluids (e.g., gas, water, hydrocarbons or combinations thereof) of different densities may exist in a hydrocarbon containing formation. A mixture of fluids in the hydrocarbon containing formation may form layers between an underburden and an overburden according to fluid density. Gas may form a top layer, hydrocarbons may form a middle layer and water may form a bottom layer in the hydrocarbon containing formation. The fluids may be present in the hydrocarbon containing formation in various amounts. Interactions between the fluids in the formation may create interfaces or boundaries between the fluids. Interfaces or boundaries between the fluids and the formation may be created through interactions between the fluids and the formation. Typically, gases do not form boundaries with other fluids in a hydrocarbon containing formation. A first boundary may form between a water layer and underburden. A second boundary may form between a water layer and a hydrocarbon layer. A third boundary may form between hydrocarbons of different densities in a hydrocarbon containing formation. Multiple fluids with multiple boundaries may be present in a hydrocarbon containing formation. It should be understood that many combinations of boundaries between fluids and between fluids and the overburden/underburden may be present in a hydrocarbon containing formation.

Production of fluids may perturb the interaction between fluids and between fluids and the overburden/underburden. As fluids are removed from the hydrocarbon containing formation, the different fluid layers may mix and form mixed fluid layers. The mixed fluids may have different interactions at the fluid boundaries. Depending on the interactions at the boundaries of the mixed fluids, production of hydrocarbons may become difficult. Quantification of the interactions (e.g., energy level) at the interface of the fluids and/or fluids and overburden/underburden may be useful to predict mobilization of hydrocarbons through the hydrocarbon containing formation.

Quantification of energy required for interactions (e.g., mixing) between fluids within a formation at an interface may be difficult to measure. Quantification of energy levels at an interface between fluids may be determined by generally known techniques (e.g., spinning drop tensiometer). Interaction energy requirements at an interface may be referred to as interfacial tension. "Interfacial tension" as used herein, refers to a surface free energy that exists between two or more fluids that exhibit a boundary. A high interfacial tension value (e.g., greater than 10 dynes/cm) may indicate the inability of one fluid to mix with a second fluid to form a fluid emulsion. As used herein, an "emulsion" refers to a dispersion of one immiscible fluid into a second fluid by addition of a composition that reduces the interfacial tension between the fluids to achieve stability. The inability of the fluids to mix may be due to high surface interaction energy between the two fluids. Low interfacial tension values (e.g., less than 1 dyne/cm) may indicate less surface interaction between the two immiscible fluids. Less surface interaction energy between two immiscible fluids may result in the mixing of the two fluids to form an emulsion. Fluids with low interfacial tension values may be mobilized to a well bore due to reduced capillary forces and subsequently produced from a hydrocarbon containing formation.

Fluids in a hydrocarbon containing formation may wet (e.g., adhere to an overburden/underburden or spread onto an overburden/underburden in a hydrocarbon containing formation). As used herein, "wettability" refers to the preference of a fluid to spread on or adhere to a solid surface in a formation in the presence of other fluids. Methods to determine wettability of a hydrocarbon formation are described by Craig, Jr. in "The Reservoir Engineering Aspects of Waterflooding", 1971 Monograph Volume 3, Society of Petroleum Engineers, which is herein incorporated by reference.

Hydrocarbons may adhere to sandstone in the presence of gas or water. An overburden/underburden that is substantially coated by hydrocarbons may be referred to as "oil wet". An overburden/underburden may be oil wet due to the presence of polar and/or heavy hydrocarbons (e.g., asphaltenes) in the hydrocarbon containing formation. Formation composition (e.g., silica, carbonate or clay) may determine the amount of adsorption of hydrocarbons on the surface of an overburden/underburden. A porous and/or permeable formation may allow hydrocarbons to more easily wet the overburden/underburden. A substantially oil wet overburden/underburden may inhibit hydrocarbon production from the hydrocarbon containing formation. An oil wet portion of a hydrocarbon containing formation may be located at less than or more than 1000 feet (305 meters) below the earth's surface.

A hydrocarbon containing formation may include water. Water may interact with the surface of the underburden. As used herein, "water wet" refers to the formation of a coat of water on the surface of the overburden/underburden. A water wet overburden/underburden may enhance hydrocarbon production from the formation by preventing hydrocarbons from wetting the overburden/underburden. A water wet portion of a hydrocarbon containing formation may include minor amounts of polar and/or heavy hydrocarbons.

Water in a hydrocarbon containing formation may contain minerals (e.g., minerals containing barium, calcium, or magnesium) and mineral salts (e.g., sodium chloride, potassium chloride, magnesium chloride). Water salinity and/or water hardness of water in a formation may affect recovery of hydrocarbons in a hydrocarbon containing formation. As used herein "salinity" refers to an amount of dissolved solids in water. "Water hardness", as used herein, refers to a concentration of multivalent ions (e.g., calcium, magnesium) in the water. Water salinity and hardness may be determined by generally known methods (e.g., conductivity, titration). As used herein, "high salinity water" refers to water that has greater than 30,000 ppm total dissolved solids based on sodium chloride. As water salinity increases in a hydrocarbon containing formation, interfacial tensions between hydrocarbons and water may be increased and the fluids may become more difficult to produce.

Low salinity water in a hydrocarbon containing formation may enhance hydrocarbon production from a hydrocarbon containing formation.

Hydrocarbons and low salinity water may form a well dispersed emulsion due to a low interfacial tension between the low salinity water and the hydrocarbons. Production of a flowable emulsion (e.g., hydrocarbons/water mixture) from a hydrocarbon containing formation may be more economically viable to a producer. As used herein, "low salinity water" refers to water salinity in a hydrocarbon containing formation that is less than 20,000 parts per million (ppm) total dissolved solids based on sodium chloride. Hydrocarbon containing formations may include water with a salinity of less than 13,000 ppm. Hydrocarbon containing formations may include water with a salinity ranging from 3,000 ppm to 10,000 ppm. Salinity of the water in hydrocarbon containing formations may range from 5,000 ppm to 8,000 ppm.

A hydrocarbon containing formation may be selected for treatment based on factors such as, but not limited to, thickness of hydrocarbon containing layers within the formation, assessed liquid production content, location of the formation, salinity content of the formation, temperature of the formation, and depth of hydrocarbon containing layers. Initially, natural formation pressure and temperature may be sufficient to cause hydrocarbons to flow into well bores and out to the surface. Temperatures in a hydrocarbon containing formation may range from 0° C. to 300° C. As hydrocarbons are produced from a hydrocarbon containing formation, pressures and/or temperatures within the formation may decline. Various forms of artificial lift (e.g., pumps, gas injection) and/or heating may be employed to continue to produce hydrocarbons from the hydrocarbon containing formation. Production of desired hydrocarbons from the hydrocarbon containing formation may become uneconomical as hydrocarbons are depleted from the formation and/or as the difficulty of extraction increases.

Mobilization of residual hydrocarbons retained in a hydrocarbon containing formation may be difficult due to viscosity of the hydrocarbons and capillary effects of fluids in pores of the hydrocarbon containing formation. As used herein "capillary forces" refers to attractive forces between fluids and at least a portion of the hydrocarbon containing formation. Capillary forces may be overcome by increasing the pressures within a hydrocarbon containing formation. Capillary forces may also be overcome by reducing the interfacial tension between fluids in a hydrocarbon containing formation. The ability to reduce the capillary forces in a hydrocarbon containing formation may depend on a number of factors, including, but not limited to, the temperature of the hydrocarbon containing formation, the salinity of water in the hydrocarbon containing formation, and the composition of the hydrocarbons in the hydrocarbon containing formation.

As production rates decrease, additional methods may be employed to make a hydrocarbon containing formation more economically viable. Methods may include adding sources of water (e.g., brine, steam), gases, polymers, monomers or any combinations thereof to the hydrocarbon formation to increase mobilization of hydrocarbons.

A hydrocarbon containing formation may be treated with a flood of water. A waterflood may include injecting water into a portion of a hydrocarbon containing formation through injections wells. Flooding of at least a portion of the formation may water wet a portion of the hydrocarbon containing formation. The water wet portion of the hydrocarbon containing formation may be pressurized by known methods and a water/hydrocarbon mixture may be collected using one or more production wells. The water layer, however, may not mix with the hydrocarbon layer efficiently. Poor mixing efficiency may be due to a high interfacial tension between the water and hydrocarbons.

Production from a hydrocarbon containing formation may be enhanced by treating the hydrocarbon containing formation with a polymer and/or monomer that may mobilize hydrocarbons to one or more production wells. The polymer and/or monomer may reduce the mobility of the water phase in pores of the hydrocarbon containing formation. The reduction of water mobility may allow the hydrocarbons to be more easily mobilized through the hydrocarbon containing formation. Polymers include, but are not limited to, polyacrylamides, partially hydrolyzed polyacrylamide, polyacrylates, ethylenic copolymers, biopolymers, carboxymethylcellulose, polyvinyl alcohol, polystyrene sulfonates, polyvinylpyrrolidone, AMPS (2-acrylamide-2-methyl propane sulfonate) or combinations thereof. Examples of ethylenic copolymers include copolymers of acrylic acid and acrylamide, acrylic acid and lauryl acrylate, lauryl acrylate and acrylamide. Examples of biopolymers include xanthan gum and guar gum. Polymers may be crosslinked in situ in a hydrocarbon containing formation. Polymers may also be generated in situ in a hydrocarbon containing formation. Polymers and polymer preparations for use in oil recovery are described in U.S. Pat. Nos. 6,427,268, 6,439,308, 5,654,261, 5,284,206, 5,199,490 and 5,103,909, the disclosures of all of which are incorporated herein by reference.

The anionic surfactant from the hydrocarbon recovery composition of the present invention, which surfactant may be of above exemplary formula (II), can advantageously be used under reservoir conditions at various salinities. For example, in the anionic surfactant of formula (II), the connecting alkylene oxide group links the alcohol hydrophobe to the negatively charged group A and is used to change the HLB of the molecule and match it to reservoir conditions in terms of salinity and crude oil. "HLB" stands for hydrophile-lipophile balance. The presence of alkylene oxide chains in the connecting group helps to provide tolerance to Ca and Mg ions in hard water.

The hydrocarbon recovery composition may interact with hydrocarbons in at least a portion of the hydrocarbon containing formation. Interaction with the hydrocarbons may reduce an interfacial tension of the hydrocarbons with one or more fluids in the hydrocarbon containing formation. A hydrocarbon recovery composition may reduce the interfacial tension between the hydrocarbons and an overburden/underburden of a hydrocarbon containing formation. Reduction of the interfacial tension may allow at least a portion of the hydrocarbons to mobilize through the hydrocarbon containing formation.

The ability of a hydrocarbon recovery composition to reduce the interfacial tension of a mixture of hydrocarbons and fluids may be evaluated using known techniques. An interfacial tension value for a mixture of hydrocarbons and water may be determined using a spinning drop tensiometer. An amount of the hydrocarbon recovery composition may be added to the hydrocarbon/water mixture and an interfacial tension value for the resulting fluid may be determined. A low interfacial tension value (e.g., less than 1 dyne/cm) may indicate that the composition reduced at least a portion of the surface energy between the hydrocarbons and water. Reduction of surface energy may indicate that at least a portion of the hydrocarbon/water mixture may mobilize through at least a portion of a hydrocarbon containing formation.

A hydrocarbon recovery composition may be added to a hydrocarbon/water mixture and the interfacial tension value may be determined. An ultralow interfacial tension value (e.g., less than 0.01 dyne/cm) may indicate that the hydrocarbon recovery composition lowered at least a portion of the surface tension between the hydrocarbons and water such that at least a portion of the hydrocarbons may mobilize through at least a portion of the hydrocarbon containing formation. At least a portion of the hydrocarbons may mobilize more easily through at least a portion of the hydrocarbon containing formation at an ultra low interfacial tension than hydrocarbons that have been treated with a composition that results in an interfacial tension value greater than 0.01 dynes/cm for the fluids in the formation. Addition of a hydrocarbon recovery composition to fluids in a hydrocarbon containing formation that results in an ultra-low interfacial tension value may increase the efficiency at which hydrocarbons may be recovered. A hydrocarbon recovery composition concentration in the hydrocarbon containing formation may be minimized to minimize cost of use during production.

The hydrocarbon recovery composition of the present invention may be provided (e.g., injected) into hydrocarbon containing formation 100 through injection well 110 as depicted in FIG. 2. Hydrocarbon formation 100 may include overburden 120, hydrocarbon layer 130, and underburden 140. Injection well 110 may include openings 112 that allow fluids to flow through hydrocarbon containing formation 100 at various depth levels. Hydrocarbon layer 130 may be less than 1000 feet (305 meters) below earth's surface. Underburden 140 of hydrocarbon containing formation 100 may be oil wet. Low salinity water may be present in hydrocarbon containing formation 100.

The hydrocarbon recovery composition of the present invention may be provided to the formation in an amount based on hydrocarbons present in a hydrocarbon containing formation. The amount of hydrocarbon recovery composition, however, may be too small to be accurately delivered to the hydrocarbon containing formation using known delivery techniques (e.g., pumps). To facilitate delivery of small amounts of the hydrocarbon recovery composition to the hydrocarbon containing formation, the hydrocarbon recovery composition may be combined with water and/or brine to produce an injectable fluid. The amount of hydrocarbon recovery composition injected into hydrocarbon containing formation 100 may be of from 0.1 to 4 wt. % of the total weight of the injectable fluid. The amount of the surfactant(s) in the injectable fluid may be of from 0.05 to 2 wt. %, preferably 0.1 to 1.5 wt. %, more preferably 0.1 to 1.0 wt. %, most preferably 0.2 to 0.5 wt. %.

The hydrocarbon recovery composition of the present invention may interact with at least a portion of the hydrocarbons in hydrocarbon layer 130. The interaction of the hydrocarbon recovery composition with hydrocarbon layer 130 may reduce at least a portion of the interfacial tension between different hydrocarbons. The hydrocarbon recovery composition may also reduce at least a portion of the interfacial tension between one or more fluids (e.g., water, hydrocarbons) in the formation and the underburden 140, one or more fluids in the formation and the overburden 120 or combinations thereof.

The hydrocarbon recovery composition of the present invention may interact with at least a portion of hydrocarbons and at least a portion of one or more other fluids in the formation to reduce at least a portion of the interfacial tension between the hydrocarbons and one or more fluids. Reduction of the interfacial tension may allow at least a portion of the hydrocarbons to form an emulsion with at least a portion of one or more fluids in the formation. An interfacial tension value between the hydrocarbons and one or more fluids may be altered by the hydrocarbon recovery composition to a value of less than 0.1 dyne/cm. An interfacial tension value between the hydrocarbons and other fluids in a formation may be reduced by the hydrocarbon recovery composition to be less than 0.05 dyne/cm. An interfacial tension value between hydrocarbons and other fluids in a formation may be lowered by the hydrocarbon recovery composition to less than 0.001 dyne/cm.

At least a portion of the hydrocarbon recovery composition/hydrocarbon/fluids mixture may be mobilized to production well 150. Products obtained from the production well 150 may include, but are not limited to, components of the hydrocarbon recovery composition, methane, carbon monoxide, water, hydrocarbons, ammonia, asphaltenes, or combinations thereof. Hydrocarbon production from hydrocarbon containing formation 100 may be increased by greater than 50% after the hydrocarbon recovery composition has been added to a hydrocarbon containing formation.

Hydrocarbon containing formation 100 may be pretreated with a hydrocarbon removal fluid. A hydrocarbon removal fluid may be composed of water, steam, brine, gas, liquid polymers, foam polymers, monomers or mixtures thereof. A hydrocarbon removal fluid may be used to treat a formation before a hydrocarbon recovery composition is provided to the formation. Hydrocarbon containing formation 100 may be less than 1000 feet (305 meters) below the earth's surface. A hydrocarbon removal fluid may be heated before injection into a hydrocarbon containing formation 100. A hydrocarbon removal fluid may reduce a viscosity of at least a portion of the hydrocarbons within the formation. Reduction of the viscosity of at least a portion of the hydrocarbons in the formation may enhance mobilization of at least a portion of the hydrocarbons to production well 150. After at least a portion of the hydrocarbons in hydrocarbon containing formation 100 have been mobilized, repeated injection of the same or different hydrocarbon removal fluids may become less effective in mobilizing hydrocarbons through the hydrocarbon containing formation. Low efficiency of mobilization may be due to hydrocarbon removal fluids creating more permeable zones in hydrocarbon containing formation 100. Hydrocarbon removal fluids may pass through the permeable zones in the hydrocarbon containing formation 100 and not interact with and mobilize the remaining hydrocarbons. Consequently, displacement of heavier hydrocarbons adsorbed to underburden 140 may be reduced over time. Eventually, the formation may be considered low producing or economically undesirable to produce hydrocarbons.

Injection of the hydrocarbon recovery composition of the present invention after treating the hydrocarbon containing formation with a hydrocarbon removal fluid may enhance mobilization of heavier hydrocarbons absorbed to underburden 140. The hydrocarbon recovery composition may interact with the hydrocarbons to reduce an interfacial tension between the hydrocarbons and underburden 140. Reduction of the interfacial tension may be such that hydrocarbons are mobilized to and produced from production well 150. Produced hydrocarbons from production well 150 may include at least a portion of the components of the hydrocarbon recovery composition, the hydrocarbon removal fluid injected into the well for pretreatment, methane, carbon dioxide, ammonia, or combinations thereof. Adding the hydrocarbon recovery composition to at least a portion of a low producing hydrocarbon containing formation may extend the production life of the hydrocarbon containing formation. Hydrocarbon production from hydrocarbon containing formation 100 may be increased by greater than 50% after the hydrocarbon recovery composition has been added to hydrocarbon containing formation. Increased hydrocarbon production may increase the economic viability of the hydrocarbon containing formation.

Interaction of the hydrocarbon recovery composition with at least a portion of hydrocarbons in the formation may reduce at least a portion of an interfacial tension between the hydrocarbons and underburden 140. Reduction of at least a portion of the interfacial tension may mobilize at least a portion of hydrocarbons through hydrocarbon containing formation 100. Mobilization of at least a portion of hydrocarbons, however, may not be at an economically viable rate.

Polymers may be injected into hydrocarbon formation 100 through injection well 110, after treatment of the formation with a hydrocarbon recovery composition, to increase mobilization of at least a portion of the hydrocarbons through the formation. Suitable polymers include, but are not limited to, Flopaam® manufactured by SNF, CIBA® ALCOFLOOD®, manufactured by Ciba Specialty Additives (Tarrytown, N.Y.), Tramfloc® manufactured by Tramfloc Inc. (Temple, Ariz.), and HE® polymers manufactured by Chevron Phillips Chemical Co. (The Woodlands, Tex.). Interaction between the hydrocarbons, the hydrocarbon recovery composition and the polymer may increase mobilization of at least a portion of the hydrocarbons remaining in the formation to production well 150.

The surfactant(s) from the hydrocarbon recovery composition of the present invention are thermally stable and may be used over a wide range of temperature. The hydrocarbon recovery composition may be added to a portion of a hydrocarbon containing formation 100 that has an average temperature of from 0 to 150° C. because of this high thermal stability.

Figure 3:
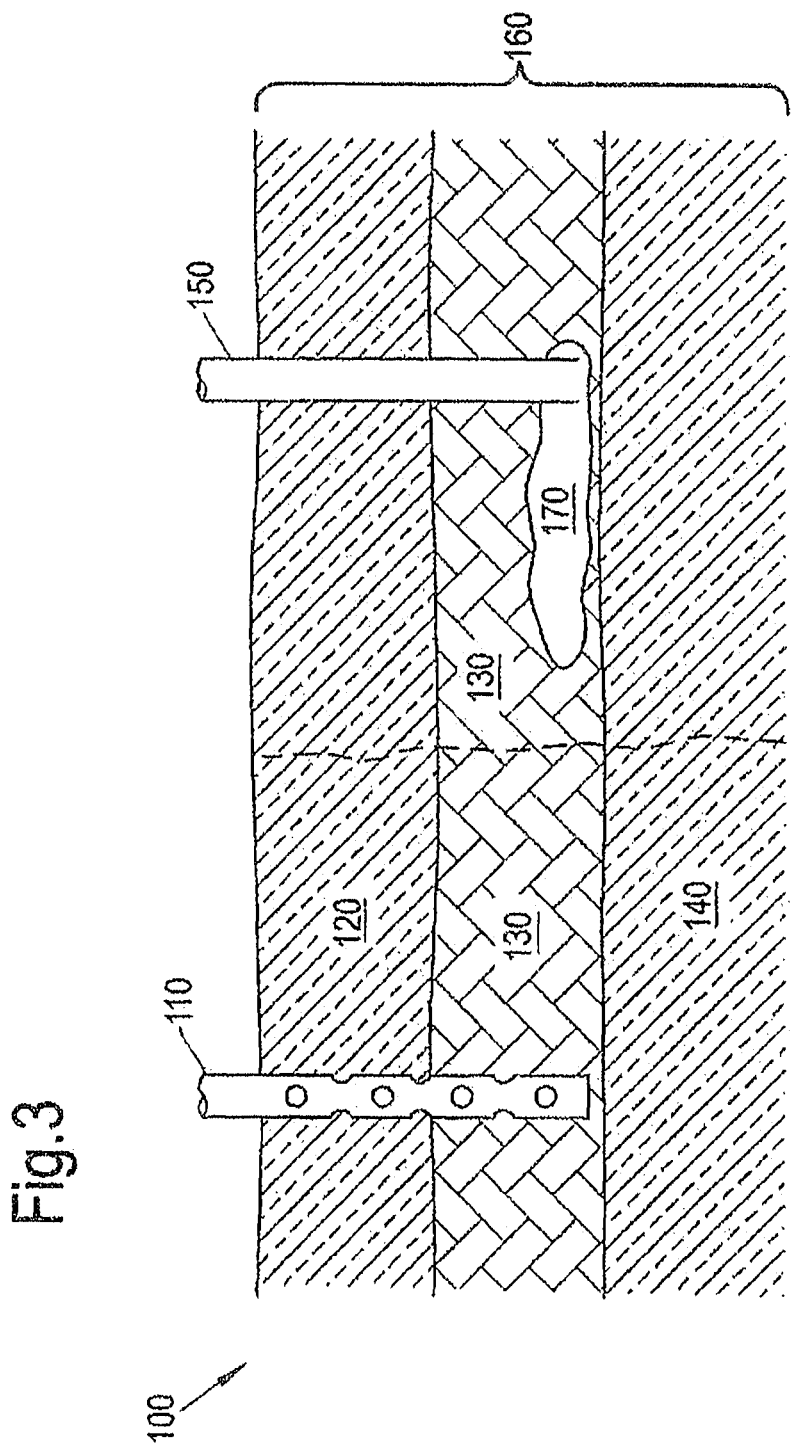
FIG. 3 is a schematic depicting of a method according to the invention.

The hydrocarbon recovery composition may also be injected into hydrocarbon containing formation 100 through injection well 110 as depicted in FIG. 3. Interaction of the hydrocarbon recovery composition with hydrocarbons in the formation may reduce at least a portion of an interfacial tension between the hydrocarbons and underburden 140. Reduction of at least a portion of the interfacial tension may mobilize at least a portion of hydrocarbons to a selected section 160 in hydrocarbon containing formation 100 to form hydrocarbon pool 170. At least a portion of the hydrocarbons may be produced from hydrocarbon pool 170 in the selected section of hydrocarbon containing formation 100.

Mobilization of at least a portion of hydrocarbons to selected section 160 may not be at an economically viable rate. Polymers may be injected into hydrocarbon formation 100 to increase mobilization of at least a portion of the hydrocarbons through the formation. Interaction between at least a portion of the hydrocarbons, the hydrocarbon recovery composition and the polymers may increase mobilization of at least a portion of the hydrocarbons to production well 150.

A hydrocarbon recovery composition may include an inorganic salt (e.g. sodium carbonate ($Na_2CO_3$), sodium chloride (NaCl), or calcium chloride ($CaCl_2$)). The addition of the inorganic salt may help the hydrocarbon recovery composition disperse throughout a hydrocarbon/water mixture. The enhanced dispersion of the hydrocarbon recovery composition may decrease the interactions between the hydrocarbon and water interface. The decreased interaction may lower the interfacial tension of the mixture and provide a fluid that is more mobile.

The invention is further illustrated by the following Examples.

EXAMPLES

1. Chemicals Used in the Examples
1.1 Surfactants A, B, C and D

Surfactants A, B, C and D were anionic sulfate surfactants of the following formula (VI):

$$[R\text{—}O\text{—}[R'\text{—}O]_x\text{—}SO_3^-][Na^+] \qquad (VI)$$

The R—O moiety in the surfactant of above formula (VI) originated from a blend of primary alcohols of formula R—OH, wherein R was a branched aliphatic group, said blend comprising less than 1 wt. % of $C_{11}$ and lower alcohols, 50 wt. % of $C_{12}$ alcohol, 48 wt. % of $C_{13}$ alcohol and less than 2 wt. % of $C_{14}$ and higher alcohols. The average carbon number for the aliphatic group R was about 12.6. Further, the average number of branches for the aliphatic group R was about 1.1. The weight ratio of linear to branched was 15:85. The aliphatic group R was randomly branched. The branches consisted of 87% of methyl branches and 13% of ethyl branches.

The R'—O moiety in the surfactant of above formula (VI) originated from propylene oxide. x, which represents the average number of moles of alkylene oxide groups per mole of alcohol, was varied as shown below.

| Surfactant | A | B | C | D |
|---|---|---|---|---|
| X | 13 | 11 | 9 | 7 |

1.2 Comparison Surfactant

The Comparison Surfactant was an anionic sulfate surfactant of the following formula (VII):

$$[R\text{—}O\text{—}[R'\text{—}O]_7\text{—}SO_3^-][Na^+] \qquad (VII)$$

The R—O moiety in the surfactant of above formula (VII) originated from an alcohol blend that is commercially available at Shell Chemicals under the product name "NEODOL® 67". "NEODOL® 67" is a blend of primary alcohols of formula R—OH, wherein R is a branched aliphatic group, said blend comprising less than 0.5 wt. % of $C_{14}$ and lower alcohols, 5 wt. % of $C_{15}$ alcohol, 31 wt. % of $C_{16}$ alcohol, 54 wt. % of $C_{17}$ alcohol, 7 wt. % of $C_{18}$ alcohol, 2 wt. % of $C_{19}$ alcohol and less than 0.2 wt. % of $C_{20}$ and higher alcohols. The average carbon number for the aliphatic group R was about 16.7. Further, the average number of branches for the aliphatic group R was about 1.4. The weight ratio of linear to branched was 3:97. The aliphatic group R was randomly branched. The branches consisted of 80% of methyl branches, 11% of ethyl branches and 9% of propyl and greater branches.

The R'—O moiety in the surfactant of above formula (VII) originated from propylene oxide.

1.3 IOS 20-24, IOS 19-23 and IOS 15-18 Surfactants

The IOS 20-24 surfactant originated from a mixture of $C_{20-24}$ internal olefins which was a mixture of only even carbon number olefins and had an average carbon number of about 20.6. Less than 3% of the total internal olefins were $C_{18}$ and lower internal olefins, 70% were $C_{20}$, 22% were $C_{22}$, 4% were $C_{24}$ and less than 1% were $C_{26}$. 96% of the internal olefins had from 20 to 24 carbon atoms.

The IOS 19-23 surfactant originated from a mixture of $C_{19-23}$ internal olefins which was a mixture of odd and even carbon number olefins and had an average carbon number of about 21.1. Less than 13.4% of the total internal olefins were $C_{18}$ and lower internal olefins, 10.5% were $C_{19}$, 15.1% were $C_{20}$, 15.4% were $C_{21}$, 13.7% were $C_{22}$, 10.5% were $C_{23}$ and less than 21.4% were $C_{24}$ and higher. 65% of the internal olefins had from 19 to 23 carbon atoms.

The IOS 15-18 surfactant originated from a mixture of $C_{15-18}$ internal olefins which was a mixture of odd and even carbon number olefins and had an average carbon number of about 16.6. The $C_{14}$ and lower olefin was 1% of the total, $C_{15}$ was 20%, $C_{16}$ was 27%, $C_{17}$ was 26%, $C_{18}$ was 21% and $C_{19}$ and higher was less than 6%. 94% of the internal olefins had from 15 to 18 carbon atoms.

The IOS 20-24, IOS 19-23 and IOS 15-18 surfactants used were sodium salts. Further properties are mentioned in the table below.

|  | Surfactant | | |
| --- | --- | --- | --- |
|  | IOS 20-24 | IOS 19-23 | IOS 15-18 |
| Internal olefins mixture used in IOS preparation | | | |
| Carbon number range (approximate) | 20-24 | 19-23 | 15-18 |
| Average carbon number | 20.6 | 21.1 | 16.6 |
| Average molecular weight | 287 | 295 | 232 |
| Weight ratio of linear:branched | 91:9 | 77:23 | 94:6 |
| IOS properties | | | |
| Free oil (wt. %) (*) | 11.2 | 11.4 | 3.1 |
| Na$_2$SO$_4$ (wt. %) (*) | 5.5 | 8.2 | 3.1 |
| Active matter (i.e. IOS surfactant) (wt. %) | 28.3 | 33.1 | 33.4 |
| Approximate composition by LC-MS | | | |
| Hydroxyalkane sulfonate (% abundance) | 75 | 64 | 81 |
| Alkene sulfonate (% abundance) | 24 | 32 | 18 |
| Di-sulfonate (% abundance) | <1 | 4 | <1 |

(*) Free oil and Na$_2$SO$_4$ are reported relative to 100% active surfactant.

1.4 Co-solvent

In cases where a co-solvent was used, it was either 2-butanol (sec-butyl alcohol, hereinafter abbreviated as "SBA") or 2-methyl-1-propanol (iso-butyl alcohol, hereinafter abbreviated as "IBA").

2. Crude Oils Used in the Examples

Six crude oils from different regions of the world were used in the Examples, designated as crude oils B, F, G, I, J and K-3. Oil properties and oil components for said crude oils are shown in the below table. From that table it is clear that the six crude oils have many varying properties.

|  | Crude oil | | | | | |
| --- | --- | --- | --- | --- | --- | --- |
|  | B | F (*) | G | I | J | K-3 |
| API gravity | 33.1 | 33.4 | 22.3 | 35 | 30 | 31.8 |
| TAN, mg KOH/g oil | 0.2 | 0.08 | 1 | 0.2 | 0.01 | 0.16 |
| a: resins, wt. % | 7.8 | n.d. | 11.6 | 5 | 3.8 | 9.8 |
| b: asphaltenes, wt. % | 0.2 | n.d. | 0.1 | 0.2 | 0.1 | 0.8 |
| Weight ratio b/a | 0.03 | n.d. | 0.01 | 0.04 | 0.03 | 0.08 |
| x: saturates, wt. % | 45.6 | n.d. | 32.4 | 60.1 | 59.1 | 52.8 |
| y: aromatics, wt. % | 46.0 | n.d. | 55.8 | 34.7 | 37.0 | 36.5 |
| Weight ratio x/y | 1.00 | n.d. | 0.58 | 1.73 | 1.60 | 1.44 |

"API" = American Petroleum Institute
"TAN" = Total Acid Number
n.d. = not determined
(*) For crude oil F, the $C_{7+}$ proportion was 95 wt. % and the $C_{15+}$ proportion was 72 wt. %.

3. Evaluation Tests

Evaluated properties of surfactant compositions, containing (i) Surfactant A, B, C or D and (ii) IOS 20-24 surfactant, IOS 19-23 surfactant or IOS 15-18 surfactant, were microemulsion phase behaviour, microemulsion viscosity and aqueous solubility. The tests used to assess these properties are described hereinbelow.

3.1 Microemulsion Phase Behaviour

Aqueous solutions comprising the surfactant composition and having different salinities were prepared. In tubes, the aqueous solutions were mixed with crude oil in a volume ratio of 1:1.

In general, microemulsion phase behaviour tests are carried out to screen surfactants for their potential to mobilize residual oil by means of lowering the interfacial tension (IFT) between the oil and water. Microemulsion phase behaviour was first described by Winsor in "Solvent properties of amphiphilic compounds", Butterworths, London, 1954. The following categories of emulsions were distinguished by Winsor: "type I" (oil-in-water emulsion), "type II" (water-in-oil emulsion) and "type III" (emulsions comprising a bicontinuous oil/water phase). A Winsor Type III emulsion is also known as an emulsion which comprises a so-called "middle phase" microemulsion. A microemulsion is characterised by having the lowest IFT between the oil and water for a given oil/water mixture.

For anionic surfactants, increasing the salinity (salt concentration) of an aqueous solution comprising the surfactant(s) causes a transition from a Winsor type I emulsion to a type III and then to a type II. Optimal salinity is defined as the salinity where equal amounts of oil and water are solubilised in the middle phase (type III) microemulsion. The oil solubilisation ratio is the ratio of oil volume ($V_o$) to neat surfactant volume ($V_s$) and the water solubilisation ratio is the ratio of water volume ($V_w$) to neat surfactant volume ($V_s$). The intersection of $V_o/V_s$ and $V_w/V_s$ as salinity is varied, defines (a) the optimal salinity and (b) the solubilisation parameter at the optimal salinity. It has been established by Huh that IFT is inversely proportional to the square of the solubilisation parameter (Huh, "Interfacial tensions and solubilizing ability of a microemulsion phase that coexists with oil and brine", J. Colloid and Interface Sci., September 1979, p. 408-426). When the solubilisation parameter is 10 or higher, the IFT at the optimal salinity is $<10^{-2}$ dyne/cm which is advantageous for mobilising residual oil via surfactant EOR. Thus, preferably, the solubilisation parameter is 10 or greater, with the higher the value the more "active" the surfactant.

The detailed microemulsion phase test method used in these Examples has been described previously, by Barnes et al. under Section 2.1 "Glass pressure tube test" in "Development of Surfactants for Chemical Flooding at Difficult Reservoir Conditions", SPE 113313, 2008, p. 1-18, was applied, the disclosure of which article is incorporated herein by reference. In summary, this test provides three important data:

(a) the optimal salinity;

(b) the solubilisation parameter at the optimal salinity (this usually takes several days or weeks to allow the phases to settle at equilibrium); and (c) in addition, a measure of the "activity" of the microemulsion is obtained by the "sway test method" described below.

The original methodology for judging the quality of the emulsion in the microemulsion phase test when gently mixing oil and water by swaying tubes is described by Nelson et al. in "Cosurfactant-Enhanced Alkali Flooding", SPE/DOE 12672, 1984, p. 413-421 (see Table 1). This methodology has been further developed by Shell as the "sway test method" where the emulsion is visually judged in terms of four criteria:

(1) its homogeneity: the more homogeneous and "creamier", the better as this indicates a more effective oil emulsification;

(2) its mobility: the more mobile, the better;

(3) its colour: the lighter the colour, the better, indicative of microemulsions around the optimal salinity; and (4) its glass wetting: a homogeneous film adhering to the glass surface is judged as good.

A rating method has been developed and a number 1-5 is given to overall microemulsion activity, from 5 for very active to 1 for very low or no activity. It is notable that most surfactant formulations reported in the literature require substantial concentrations of co-solvent to minimize high viscosity phases and gels. The salinities at which microemulsion phase behaviour using the "sway test method" was tested, comprised the optimal salinity and various salinities above and below the optimal salinity.

3.2 Microemulsion Viscosity

Aqueous solutions comprising the surfactant composition and having a total salt concentration corresponding to the optimal salinity as determined in the above-described microemulsion phase behaviour test, were prepared. In tubes, the aqueous solutions were mixed with crude oil in a volume ratio of 1:1.

Dynamic viscosity measurements were carried out on the oil/water systems prepared using a Physica MCR 100 viscometer which has control of both temperature and sample shear. Viscosities were measured across shear rates of 1 to 1000 s$^{-1}$ resulting in fully mixed oil/water/microemulsion systems. In general, with such shear, the condition of a fluid in the rapid mixing environment of the pores of an oil reservoir is simulated.

3.3 Aqueous Solubility

Aqueous solutions comprising the surfactant composition and having different salinities were prepared in tubes. The salinities tested comprised the optimal salinity as determined in the microemulsion phase behaviour test, and lower salinities. The salinity was increased, up to and slightly beyond the optimal salinity, typically with increasing increments of 0.5% salinity. For each salinity, 2 identical aqueous solutions were prepared in separate tubes. One of these 2 tubes was kept at ambient temperature (about 20° C.), whereas the other tube was kept at the temperature used in the microemulsion phase behaviour test. All tubes were stored up to 7 days. At the end of the test, it was visually assessed whether or not there was any turbidity in the solution in the tube and/or any precipitation of a solid layer. Aqueous solutions that remained clear and bright and did not contain such precipitated layer, were found acceptable in terms of aqueous solubility.

4. EXAMPLES

Summary

In the below table, a summary of Examples 1-13 and Comparative Examples 1-2 is included. Further details are described further below in Examples 1-13 and Comparative Examples 1-2.

|  | Formula (VI) surfactant s1 | IOS surfactant s2 | wt. % s1 | wt. % s2 | weight ratio s1:s2 | Cosolvent, type + wt. % | Crude oil (1) | T, ° C. (1) |
|---|---|---|---|---|---|---|---|---|
| Ex. 1 | A: C12-13, x = 13 | IOS 20-24 | 0.2 | 0.1 | 2:1 | SBA: 0/0.5/1.0 | F | 54 |
| Ex. 2 | B: C12-13, x = 11 | IOS 20-24 | 0.2 | 0.1 | 2:1 | SBA: 0/0.5/1.0 | F | 54 |
| Ex. 3 | C: C12-13, x = 9 | IOS 20-24 | 0.2 | 0.1 | 2:1 | SBA: 0/0.5/1.0 | F | 54 |
| Ex. 4 | C: C12-13, x = 9 | IOS 20-24 | 0.2 | 0.1 | 2:1 | SBA: 0/1.0 | K-3 | 50 |
| Ex. 5 | C: C12-13, x = 9 | IOS 20-24 | 1.33 | 0.67 | 2:1 | SBA: 0/1.0 | K-3 | 50 |
|  | C: C12-13, x = 9 | IOS 20-24 | 0.67 | 0.33 | 2:1 | SBA: 0/1.0 | K-3 | 50 |
| Ex. 6 | A: C12-13, x = 13 | IOS 15-18 | 0.75 | 0.25 | 3:1 | IBA: 0.5 | K-3 | 29 |
| Ex. 7 | A: C12-13, x = 13 | IOS 15-18 | 0.8 | 0.2 | 4:1 | IBA: 0.5 | K-3 | 24/29 (2) |
| Comp. Ex. 1 | C16-17, x = 7 | IOS 15-18 | 0.75 | 0.25 | 3:1 | IBA: 1.0 | K-3 | 24/29 (2) |
| Ex. 8 | B: C12-13, x = 11 | IOS 15-18 | 0.75 | 0.25 | 3:1 | IBA: 0.5 | K-3 | 29 |
| Ex. 9 | C: C12-13, x = 9 | IOS 15-18 | 0.75 | 0.25 | 3:1 | IBA: 0.5 | K-3 | 29 |
| Ex. 10 | B: C12-13, x = 11 | IOS 19-23 | 0.225 | 0.075 | 3:1 | 0 | G | 46 |
| Ex. 11 | B: C12-13, x = 11 | IOS 15-18 | 0.3 | 0.2 | 3:2 | 0 | I | 50 |
| Ex. 12 | D: C12-13, x = 7 | IOS 15-18 | 0.3 | 0.075 | 4:1 | 0 | J | 50 |
| Ex. 13 | C: C12-13, x = 9 | IOS 20-24 | 0.1 | 0.4 | 1:4 | 0 | B | 50 |
| Comp. Ex. 2 | C16-17, x = 7 | IOS 15-18 | 0.3 | 0.075 | 4:1 | 0 | J | 50 |

Ex. = Example;
Comp. Ex. = Comparative Example;
SBA = 2-butanol;
IBA = 2-methyl-1-propanol; surfactants s1 and s2 and crude oils B, F, G, I, J and K-3 are described in further detail above.
(1) Both in the "Microemulsion phase behaviour" test and, where applied, in the "Microemulsion viscosity"test.
(2) In the "Microemulsion phase behaviour" test: 29° C. In the "Microemulsion viscosity" test: 24 or 29° C.

Example 1

In the tests below, the surfactant composition contained Surfactant A and IOS 20-24 surfactant. Said 2 surfactants were used in the aqueous solutions tested in concentrations of 0.2 wt. % and 0.1 wt. %, respectively, that is to say in a weight ratio of 2:1. Three sets of aqueous solutions were tested which, in addition to said 2 surfactants, contained 0 wt. %, 0.5 wt. % and 1.0 wt. %, respectively, of SBA as co-solvent. That is to say, the weight ratio of total surfactants to co-solvent was 0, 1.8:3.0 and 0.9:3.0, respectively.

Aqueous solubility: The optimal salinity corresponded to a total salt concentration of 2.35 wt. %, consisting of 1.25 wt. % of $Na_2CO_3$ and 1.1 wt. % of additional salts. Said additional salts originated from water comprising the following ions (in mg/litre): $Na^+$ (4143), $K^+$ (54), $Cl^-$ (5900), $SO_4^{2-}$ (420), $HCO_3^-$ (390). The lower than optimal salinities were obtained by reducing the $Na_2CO_3$ concentration.

It was found that the aqueous solubility at all salinities, with and without SBA as co-solvent, was acceptable.

Microemulsion phase behaviour: This test was carried out on crude oil F, at a temperature of 54° C., at the same salinities as used in the aqueous solubility test and at salinities higher than the optimal salinity. The higher than optimal salinities were obtained by increasing the $Na_2CO_3$ concentration.

It was found that only a relatively small amount of co-solvent was required to obtain highly active microemulsion phase behaviour at around the optimal salinity. The sway test rating for both SBA containing solutions (0.5 wt. % and 1.0 wt. %) was 3/4. For the solution containing no co-solvent, there was still active microemulsion phase behaviour, though at a lower level (sway test rating of 2).

Example 2

In the tests below, the surfactant composition contained Surfactant B and IOS 20-24 surfactant. Said 2 surfactants were used in the aqueous solutions tested in concentrations of 0.2 wt. % and 0.1 wt. %, respectively, that is to say in a weight ratio of 2:1. Three sets of aqueous solutions were tested which, in addition to said 2 surfactants, contained 0 wt. %, 0.5 wt. % and 1.0 wt. %, respectively, of SBA as co-solvent. That is to say, the weight ratio of total surfactants to co-solvent was 0, 1.8:3.0 and 0.9:3.0, respectively.

Aqueous solubility: The procedure of Example 1 was repeated. The optimal salinity corresponded to a total salt concentration of 2.35 wt. %, consisting of 1.25 wt. % of $Na_2CO_3$ and 1.1 wt. % of (the same) additional salts. It was found that the aqueous solubility at all salinities, with and without SBA as co-solvent, was acceptable.

Microemulsion phase behaviour: The procedure of Example 1 was repeated. It was found that the solution containing no co-solvent had the most active microemulsion phase behaviour (sway test rating of 4) at around the optimal salinity, compared to the SBA containing solutions (0.5 wt. % and 1.0 wt. %) for both of which the sway test rating was 3. This shows that Surfactant B (Example 2) is better matched to crude oil F than Surfactant A (Example 1) and Surfactant C (Example 3) in terms of microemulsion phase behaviour.

Example 3

In the tests below, the surfactant composition contained Surfactant C and IOS 20-24 surfactant. Said 2 surfactants were used in the aqueous solutions tested in concentrations of 0.2 wt. % and 0.1 wt. %, respectively, that is to say in a weight ratio of 2:1. Three sets of aqueous solutions were tested which, in addition to said 2 surfactants, contained 0 wt. %, 0.5 wt. % and 1.0 wt. %, respectively, of SBA as co-solvent. That is to say, the weight ratio of total surfactants to co-solvent was 0, 1.8:3.0 and 0.9:3.0, respectively.

Aqueous solubility: The procedure of Example 1 was repeated. The optimal salinity corresponded to a total salt concentration of 2.6 wt. %, consisting of 1.5 wt. % of $Na_2CO_3$ and 1.1 wt. % of (the same) additional salts. It was found that the aqueous solubility at all salinities, with and without SBA as co-solvent, was acceptable.

Microemulsion phase behaviour: The procedure of Example 1 was repeated. It was found that only a relatively small amount of co-solvent was required to obtain highly active microemulsion phase behaviour at around the optimal salinity. The sway test rating for both SBA containing solutions (0.5 wt. % and 1.0 wt. %) was 3/4. For the solution containing no co-solvent, there was still active microemulsion phase behaviour, though at a lower level (sway test rating of 1).

Microemulsion viscosity: This test was carried out on a total of 3 oil-water-microemulsion systems comprising (i) crude oil F and (ii) 1 of the 3 solutions used in the above microemulsion phase behaviour test, at a temperature of 54° C. and at a shear rate of 10 $s^{-1}$. It was found that all of said 3 systems had relatively low viscosities: 9 cP and lower. The viscosity of crude oil F as such was 9 cP (at 54° C.).

Example 4

In the tests below, the surfactant composition contained Surfactant C and IOS 20-24 surfactant. Said 2 surfactants were used in the aqueous solutions tested in concentrations of 0.2 wt. % and 0.1 wt. %, respectively, that is to say in a weight ratio of 2:1. Two sets of aqueous solutions were tested which, in addition to said 2 surfactants, contained 0 wt. % and 1.0 wt. %, respectively, of SBA as co-solvent. That is to say, the weight ratio of total surfactants to co-solvent was 0 and 0.9:3.0, respectively.

Aqueous solubility: The procedure of Example 1 was repeated. The optimal salinity corresponded to a salt concentration of 4.1 wt. % of $Na_2CO_3$. It was found that the aqueous solubility at all salinities, with and without SBA as co-solvent, was acceptable.

Microemulsion phase behaviour: The procedure of Example 1 was repeated, with the proviso that the crude oil was crude oil K-3 and the temperature was 50° C. It was found that the solution containing no co-solvent had the most active microemulsion phase behaviour (sway test rating of 3/4) at around the optimal salinity, compared to the SBA containing solution (1.0 wt. %) for which the sway test rating was 2/3.

Microemulsion viscosity: This test was carried out on a total of 2 oil-water-microemulsion systems comprising (i) crude oil K-3 and (ii) 1 of the 2 solutions used in the above microemulsion phase behaviour test, at a temperature of 50° C. and at a shear rate of 10 $s^{-1}$. It was found that all of said 2 systems had relatively low viscosities: 10 cP and lower.

Example 5

In the tests below, the surfactant composition contained Surfactant C and IOS 20-24 surfactant. Said 2 surfactants were used in the aqueous solutions tested at relatively high concentrations, and in a weight ratio of 2:1.

In one case, the total surfactant concentration was 2 wt. % (1.33 wt. % of Surfactant C and 0.67 wt. % of IOS 20-24 surfactant). In another case, the total surfactant concentration was 1 wt. % (0.67 wt. % of Surfactant C and 0.33 wt. % of IOS 20-24 surfactant).

For each of said 2 cases, two sets of aqueous solutions were tested which, in addition to said 2 surfactants, contained 0 wt. % and 1.0 wt. %, respectively, of SBA as co-solvent. That is to say, for the first case (total surfactant concentration of 2 wt. %), the weight ratio of total surfactants to co-solvent was 6:3, and for the second case (total surfactant concentration of 1 wt. %), the weight ratio of total surfactants to co-solvent was 3:3.

Aqueous solubility: The procedure of Example 1 was repeated. The optimal salinity corresponded to a salt concentration of 4.0 wt. % of $Na_2CO_3$. It was found that the aqueous solubility at all salinities, with and without SBA as co-solvent, was acceptable, for both said cases (total surfactant concentrations of 1 wt. % and 2 wt. %).

Microemulsion phase behaviour: The procedure of Example 1 was repeated, with the proviso that the crude oil was crude oil K-3 and the temperature was 50° C. It was found that the solution containing no co-solvent and the SBA containing solution (1.0 wt. %) both had highly active microemulsion phase behaviour at around the optimal salinity based on their sway test ratings of 4, for both said cases (total surfactant concentrations of 1 wt. % and 2 wt. %). However, the solubilisation parameter was measured at around 35 for the solution containing no co-solvent and at only around 15 for the SBA containing solution (1.0 wt. %), for both said cases (total surfactant concentrations of 1 wt. % and 2 wt. %). This indicates that the solution containing no co-solvent is superior in terms of overall microemulsion phase behaviour.

Microemulsion viscosity: The procedure of Example 4 was repeated. Microemulsion viscosity was only determined for the case where the total surfactant concentration was 2 wt. %. It was found that both oil-water-microemulsion systems had relatively low viscosities: 12 cP and lower.

Conclusion from the Results for Examples 1-5 (Relatively Low Amount of Divalent Ions; Crude Oils A and B)

It can be concluded from the results for Examples 1-5 that acceptable aqueous solubility, active microemulsion phase behaviour, a high solubilisation parameter and low microemulsion viscosity are obtained with Surfactants A, B and C over a wide range of total surfactant concentrations (0.3, 1 and 2 wt. %). All of said surfactants are of the above formula (VI), wherein x may thus be varied depending on the desired salinity of the solution and/or on the type of crude oil in question. Further, it has been demonstrated that either no co-solvent or only a small amount of co-solvent (0.5 wt. % of SBA) may be needed in order to obtain optimal results since microemulsion viscosities at around the optimal salinity were relatively low compared to the viscosity of the crude oil.

Example 6

In the tests below, the surfactant composition contained Surfactant A and IOS 15-18 surfactant. Said 2 surfactants were used in the aqueous solutions tested in concentrations of 0.75 wt. % and 0.25 wt. %, respectively, that is to say in a weight ratio of 3:1. In addition, the aqueous solutions tested contained 0.5 wt. % of IBA as co-solvent. That is to say, the weight ratio of total surfactants to co-solvent was 6:3.

Aqueous solubility: The optimal salinity corresponded to a total dissolved solids (TDS) concentration of 3.8 wt. %. The brine used to adjust the salinity of the aqueous solutions tested comprised 6.5 wt. % of TDS and 3500 mg/l of divalent ions, largely Ca and Mg ions. This brine was diluted with de-ionised water to give aqueous solutions having a lower TDS concentration.

It was found that the aqueous solubility at all salinities was acceptable.

Microemulsion phase behaviour: This test was carried out on crude oil K-3 and at a temperature of 29° C.

It was found that there was a highly active microemulsion phase behaviour (sway test rating of 3) at around the optimal salinity. Furthermore, the solubilisation parameter was measured at around 40.

Example 7

In the tests below, the same aqueous solutions were tested as in Example 6, with the proviso that the solutions tested in this example contained Surfactant A and IOS 15-18 surfactant in concentrations of 0.8 wt. % and 0.2 wt. %, respectively, that is to say in a weight ratio of 4:1.

Aqueous solubility: The procedure of Example 6 was repeated. The optimal salinity corresponded to a TDS concentration of 2.5 wt. %. It was found that the aqueous solubility at all salinities was acceptable.

Microemulsion phase behaviour: The procedure of Example 6 was repeated. It was found that there was a highly active microemulsion phase behaviour (sway test rating of 4) at around the optimal salinity. Furthermore, the solubilisation parameter was measured at around 25.

Microemulsion viscosity: This test was carried out on an oil-water-microemulsion system comprising (i) crude oil K-3 and (ii) the solution used in the above microemulsion phase behaviour test, at a temperature of 24 or 29° C. It was found that said system had relatively low viscosities at both said temperatures: 20 cP and lower, with the higher viscosities being measured at lower shear rate which is in line with non-Newtonian behaviour. The viscosity of crude oil K-3 as such was 7 cP (at 29° C.) and 10 cP (at 24° C.), both at a shear rate of 10 s$^{-1}$.

Comparative Example 1

In the tests below, the surfactant composition contained the Comparison Surfactant and IOS 15-18 surfactant. Said 2 surfactants were used in the aqueous solutions tested in concentrations of 0.75 wt. % and 0.25 wt. %, respectively, that is to say in a weight ratio of 3:1. In addition, the aqueous solutions tested contained 1.0 wt. % of IBA as co-solvent (compared to 0.5 wt. % in Examples 6 and 7). That is to say, the weight ratio of total surfactants to co-solvent was 3:3.

Aqueous solubility: The procedure of Example 6 was repeated. The optimal salinity corresponded to a TDS concentration of 4.8 wt. %.

It was found that the aqueous solubility at salinities corresponding to TDS concentrations up to 2.5 wt. % was acceptable, but was no longer acceptable when going beyond said 2.5 wt. % up to 4.8 wt. %. This indicates that the use of a higher IBA co-solvent concentration than in Examples 6 and 7 did not even result in a similar aqueous solubility. In fact, the aqueous solubility was worse.

Microemulsion phase behaviour: This test was carried out on crude oil K-3 and at a temperature of 29° C.

It was found that there was a highly active microemulsion phase behaviour (sway test rating of 4) at around the optimal salinity. However, the solubilisation parameter was measured at only around 12. This indicates that the surfactant systems used in Examples 6 and 7 are superior in terms of overall microemulsion phase behaviour.

Microemulsion viscosity: The procedure of Example 7 was repeated. It was found that the oil-water-microemulsion system in question had viscosities ranging, across the shear rate range moving from low to high shear, from 33 to 16 cP (at 29° C.) and 45 to 22 cP (at 24° C.). As for Example 7, this indicates that the system exhibited classic non-Newtonian behaviour: that is to say, viscosity decrease at a higher shear rate. Further, said results indicate that the Comparison Surfactant resulted in higher viscosities and that these viscosities are more sensitive to a modest change in temperature, compared to Example 7. The viscosity of crude oil K-3 as such was 7 cP (at 29° C.) and 10 cP (at 24° C.), at a shear rate of 10 s$^{-1}$.

Example 8

In the tests below, the same aqueous solutions were tested as in Example 6, with the proviso that the solutions tested in this example contained Surfactant B instead of Surfactant A.

Aqueous solubility: The procedure of Example 6 was repeated. The optimal salinity corresponded to a TDS concentration of 3.6 wt. %. It was found that the aqueous solubility at all salinities was acceptable.

Microemulsion phase behaviour: The procedure of Example 6 was repeated. It was found that there was a highly active microemulsion phase behaviour (sway test rating of 4) at around the optimal salinity. Furthermore, the solubilisation parameter was measured at around 50-60.

Example 9

In the tests below, the same aqueous solutions were tested as in Example 6, with the proviso that the solutions tested in this example contained Surfactant C instead of Surfactant A.

Aqueous solubility: The procedure of Example 6 was repeated. The optimal salinity corresponded to a TDS concentration of 5.5 wt. %. It was found that the aqueous solubility at all salinities was acceptable.

Microemulsion phase behaviour: The procedure of Example 6 was repeated. It was found that there was a fairly active microemulsion phase behaviour (sway test rating of 2) at around the optimal salinity. Furthermore, the solubilisation parameter was measured at around 15.

Conclusion from the Results for Examples 6-9 and Comparative Example 1 (Relatively High Amount of Divalent Ions; Crude Oil K-3)

It can be concluded from the results for Examples 6-9 and Comparative Example 1 that also in the presence of a relatively high amount of divalent ions (such as Ca and Mg ions), which is different from Examples 1-5, acceptable aqueous solubility, active microemulsion phase behaviour, a high solubilisation parameter and low microemulsion viscosity are obtained with Surfactants A, B and C. This is especially apparent from comparison with the Comparison Surfactant. See the discussion under Comparative Example 1 wherein the Comparison Surfactant was used.

Example 10

In the tests below, the surfactant composition contained Surfactant B and IOS 19-23 surfactant. Said 2 surfactants were used in the aqueous solutions tested in concentrations of 0.225 wt. % and 0.075 wt. %, respectively, that is to say in a weight ratio of 3:1. Said aqueous solutions did not contain a co-solvent. That is to say, the weight ratio of total surfactants to co-solvent was 0.

Aqueous solubility: The procedure of Example 1 was repeated. The optimal salinity corresponded to a total salt concentration of 1.5 wt. %, consisting of 1 wt. % of $Na_2CO_3$ and 0.5 wt. % of NaCl. It was found that the aqueous solubility at all salinities, even without a co-solvent, was acceptable.

Microemulsion phase behaviour: The procedure of Example 1 was repeated, with the proviso that the test temperature was 46° C. and the crude oil tested was crude oil G. It was found that no co-solvent was required to obtain highly active microemulsion phase behaviour at around the optimal salinity.

Microemulsion Viscosity:

This test was carried out on an oil-water-microemulsion system comprising (i) crude oil G and (ii) the solution used in the above microemulsion phase behaviour test, at a temperature of 46° C. and at a shear rate of 10 $s^{-1}$.

Example 11

In the tests below, the surfactant composition contained Surfactant B and IOS 15-18 surfactant. Said 2 surfactants were used in the aqueous solutions tested in concentrations of 0.3 wt. % and 0.2 wt. %, respectively, that is to say in a weight ratio of 3:2. Said aqueous solutions did not contain a co-solvent. That is to say, the weight ratio of total surfactants to co-solvent was 0.

Aqueous solubility: The optimal salinity corresponded to a total dissolved solids (TDS) concentration of 3.3 wt. %. The brine used to adjust the salinity of the aqueous solutions tested comprised 6.5 wt. % of TDS and 3500 mg/l of divalent ions, largely Ca and Mg ions. This brine was diluted with de-ionised water to give aqueous solutions having a lower TDS concentration.

It was found that the aqueous solubility, even without a co-solvent, at all salinities was acceptable.

Microemulsion phase behaviour: The procedure of Example 1 was repeated, with the proviso that the test temperature was 50° C. and the crude oil tested was crude oil I. It was found that no co-solvent was required to obtain highly active microemulsion phase behaviour at around the optimal salinity. The sway test rating was 4/5. Further, the solubilisation parameter was measured at around 20.

Example 12

In the tests below, the surfactant composition contained Surfactant D and IOS 15-18 surfactant. Said 2 surfactants were used in the aqueous solution tested in concentrations of 0.3 wt. % and 0.075 wt. %, respectively, that is to say in a weight ratio of 4:1. Said aqueous solution did not contain a co-solvent. That is to say, the weight ratio of total surfactants to co-solvent was 0.

Aqueous solubility: The procedure of Example 1 was repeated. The optimal salinity corresponded to a total salt concentration of 3.5 wt. %, consisting of 1 wt. % of $Na_2CO_3$ and 2.5 wt. % of NaCl. It was found that the aqueous solubility at all salinities, even without a co-solvent, was acceptable. The aqueous solution was clear at room temperature and at a (reservoir) temperature of 50° C., and said clarity did not change in time. Said solution remained clear till 4% NaCl, even after 1 week.

Microemulsion phase behaviour: The procedure of Example 1 was repeated, with the proviso that the test temperature was 50° C. and the crude oil tested was crude oil J. It was found that no co-solvent was required to obtain highly active microemulsion phase behaviour at around the optimal salinity. The sway test rating was 4/5.

Figure 4:
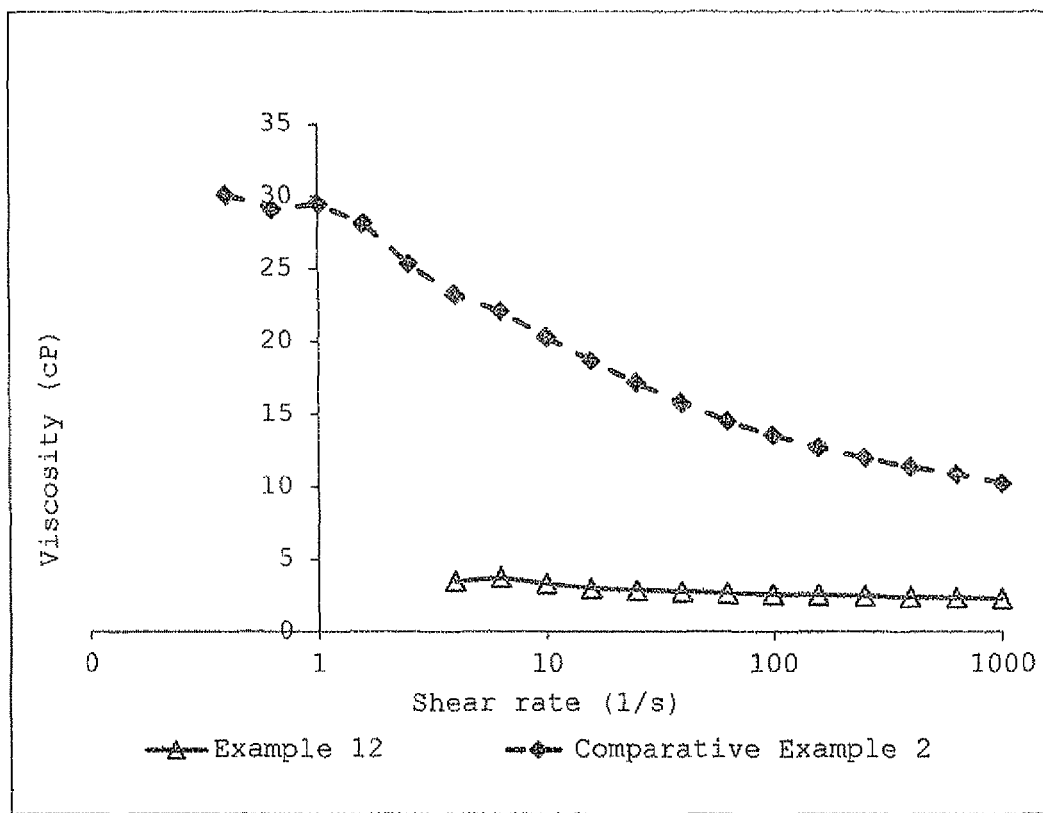
FIG. 4 is a graphically representation of the microemulsion viscosity at varying shear rates.

Microemulsion viscosity: This test was carried out on an oil-water-microemulsion system comprising (i) crude oil J and (ii) the solution used in the above microemulsion phase behaviour test, at a temperature of 50° C. It was found that said system had a relatively low viscosity which remained stable over a wide range of shear rates: below 5 cP. In FIG. 4, the microemulsion viscosity at varying shear rates is graphically shown for Example 12.

Example 13

In the tests below, the surfactant composition contained Surfactant C and IOS 20-24 surfactant. Said 2 surfactants were used in the aqueous solution tested in concentrations of 0.1 wt. % and 0.4 wt. %, respectively, that is to say in a weight ratio of 1:4. Said aqueous solution did not contain a co-solvent. That is to say, the weight ratio of total surfactants to co-solvent was 0.

Aqueous solubility: The procedure of Example 1 was repeated. The optimal salinity corresponded to a total salt concentration of 2.5 wt. % consisting of Na$_2$CO$_3$. It was found that the aqueous solubility, even without a co-solvent, was acceptable.

Microemulsion phase behaviour: The procedure of Example 1 was repeated, with the proviso that the test temperature was 50° C. and the crude oil tested was crude oil B. It was found that no co-solvent was required to obtain highly active microemulsion phase behaviour at around the optimal salinity. The sway test rating was 4. Further, the solubilisation parameter was measured at around 55.

Comparative Example 2

In the tests below, the surfactant composition contained the Comparison Surfactant and IOS 15-18 surfactant. Said 2 surfactants were used in the aqueous solution tested in concentrations of 0.3 wt. % and 0.075 wt. %, respectively, that is to say in a weight ratio of 4:1. Said aqueous solution did not contain a co-solvent. That is to say, the weight ratio of total surfactants to co-solvent was 0.

Aqueous solubility: The procedure of Example 1 was repeated. The optimal salinity corresponded to a total salt concentration of 3.5 wt. %, consisting of 1 wt. % of Na$_2$CO$_3$ and 2.5 wt. % of NaCl. Contrary to Example 12, for Comparative Example 2, it was found that the aqueous solubility was not acceptable at all salinities. At a (reservoir) temperature of 50° C., the aqueous solution was clear till 3% NaCl. However, at a salinity higher than 3% NaCl (also at 50° C.), the solution became turbid after shaking and separated into 2 layers after 1 day.

Microemulsion phase behaviour: The procedure of Example 1 was repeated, with the proviso that the test temperature was 50° C. and the crude oil tested was crude oil J. It was found that there was no highly active microemulsion phase behaviour at around the optimal salinity. The sway test rating was only 2, whereas in Example 12 it was 4/5.

Microemulsion viscosity: This test was carried out on an oil-water-microemulsion system comprising (i) crude oil J and (ii) the solution used in the above microemulsion phase behaviour test, at a temperature of 50° C. It was found that said system had a relatively high viscosity which did not remain stable over a wide range of shear rates. In FIG. 4, the microemulsion viscosity at varying shear rates is graphically shown for Comparative Example 2 (and for Example 12). From FIG. 4, it is clear that, as compared to Comparative Example 2, for Example 12 the viscosity was advantageously relatively low and remained stable over a wide range of shear rates.

Conclusion from the Results for Examples 10-13 and Comparative Example 2

Overall, this section has shown that binary blends, comprising (i) an alcohol-alkoxy-sulfate in accordance with the invention and (ii) an IOS, from a few core surfactants match formulations across regionally different crude oils thereby simplifying formulation selection. In addition, these binary blend formulations demonstrate good aqueous solubility, even in the presence of high concentration of divalent ions, and do not require co-solvent.

What is claimed is:

1. A method of treating a hydrocarbon containing formation, comprising:
    (a) providing an aqueous composition to at least a portion of the hydrocarbon containing formation, wherein the composition comprises an anionic surfactant based on an alkoxylated primary alcohol having a branched aliphatic group, which group has an average carbon number of from 9 to 15 and an average number of branches of from 0.5 to 2.5, and having an average of at least 0.5 mole of alkylene oxide groups per mole of primary alcohol wherein the alkylene oxide groups are ethylene oxide groups, propylene oxide groups or mixtures thereof; and wherein the composition additionally comprises an internal olefin sulfonate (IOS); and
    (b) allowing the composition to interact with hydrocarbons in the hydrocarbon containing formation.

2. The method of claim 1 wherein the branched aliphatic group of the alkoxylated primary alcohol has an average number of branches of from 0.7 to 2.0.

3. The method of claim 1 wherein the alkylene oxide groups consist of propylene oxide groups.

4. The method of claim 1 wherein the alkoxylated primary alcohol has an average of from 2 to 20 moles of alkylene oxide groups per mole of primary alcohol.

5. The method of claim 1 wherein the branched aliphatic group of the alkoxylated primary alcohol has an average carbon number of from 10 to 15.

6. The method of claim 1 wherein the IOS comprises one or more IOS selected from the group consisting of C15-18 IOS, C19-23 IOS, C20-24 IOS and C24-28 IOS.

7. The method of claim 1 wherein in step (a) no co-solvent is provided.

8. The method of claim 1 wherein in step (a) a co-solvent is provided to the at least a portion of the hydrocarbon containing formation, and the total weight of surfactant(s) provided to the total weight of co-solvent(s) provided is above 1:3.

9. An aqueous hydrocarbon recovery composition which comprises an anionic surfactant based on an alkoxylated primary alcohol having a branched aliphatic group, which group has an average carbon number of from 9 to 15 and an average number of branches of from 0.5 to 2.5, and having an average of at least 0.5 mole of alkylene oxide groups per mole of primary alcohol wherein the alkylene oxide groups are ethylene oxide groups, propylene oxide groups or mixtures thereof and which additionally comprises an internal olefin sulfonate (IOS).

10. The composition of claim 9 wherein the branched aliphatic group of the alkoxylated primary alcohol has an average number of branches of from 0.7 to 2.0.

11. The composition of claim 9 wherein the alkylene oxide groups consist of propylene oxide groups.

12. The composition of claim 9 wherein the alkoxylated primary alcohol has an average of from 2 to 20 moles of alkylene oxide groups per mole of primary alcohol.

13. The composition of claim 9 wherein the branched aliphatic group of the alkoxylated primary alcohol has an average carbon number of from 10 to 15.

14. The composition of claim 9 wherein the IOS comprises one or more IOS selected from the group consisting of C15-18 IOS, C19-23 IOS, C20-24 IOS and C24-28 IOS.

15. The composition of claim 9 which does not comprise a co-solvent.

16. The composition of claim 9 which comprises a co-solvent, wherein the total weight of surfactant(s) in the composition to the total weight of co-solvent(s) in the composition is above 1:3.

17. An aqueous hydrocarbon containing composition produced from a hydrocarbon containing formation, which comprises hydrocarbons and an anionic surfactant based on an alkoxylated primary alcohol having a branched aliphatic group, which group has an average carbon number of from 9 to 15 and an average number of branches of from 0.5 to 2.5, and having an average of at least 0.5 mole of alkylene oxide groups per mole of primary alcohol wherein the alkylene oxide groups are ethylene oxide groups, propylene oxide groups or mixtures thereof; and which additionally comprises an internal olefin sulfonate (IOS).

18. The composition of claim 17 which has been produced from the hydrocarbon containing formation by means of the method as defined in claim 1.

\* \* \* \* \*